(12) United States Patent
Lumetta

(10) Patent No.: US 12,116,681 B2
(45) Date of Patent: Oct. 15, 2024

(54) SYSTEM AND METHOD FOR GENERATING A CHLORINE-CONTAINING MIXTURE

(71) Applicant: Michael Lumetta, Lake Orion, MI (US)

(72) Inventor: Michael Lumetta, Lake Orion, MI (US)

(*) Notice: Subject to any disclaimer, the term of this patent is extended or adjusted under 35 U.S.C. 154(b) by 0 days.

(21) Appl. No.: 15/766,512

(22) PCT Filed: Oct. 7, 2016

(86) PCT No.: PCT/US2016/055891
§ 371 (c)(1),
(2) Date: Apr. 6, 2018

(87) PCT Pub. No.: WO2017/062707
PCT Pub. Date: Apr. 13, 2017

(65) Prior Publication Data
US 2018/0291514 A1  Oct. 11, 2018

Related U.S. Application Data

(60) Provisional application No. 62/238,268, filed on Oct. 7, 2015.

(51) Int. Cl.
*C25B 1/26* (2006.01)
*C02F 1/467* (2023.01)
(Continued)

(52) U.S. Cl.
CPC .............. *C25B 1/26* (2013.01); *C02F 1/4674* (2013.01); *C25B 9/19* (2021.01); *C25B 9/77* (2021.01); *C25B 15/08* (2013.01)

(58) Field of Classification Search
CPC ......... C02F 1/4674; C25B 1/26; C25B 9/066; C25B 9/08; C25B 9/09
See application file for complete search history.

(56) References Cited

U.S. PATENT DOCUMENTS 4,790,946 A    12/1988  Jansen
9,546,427 B2 *  1/2017  Lumetta ................. C25B 1/26
(Continued)

FOREIGN PATENT DOCUMENTS

WO    WO2012170774 A1    12/2012

OTHER PUBLICATIONS

Wikipedia page on Vacuum Ejectors.*
PCT/US2016/055891 International Search Report dated Jan. 17, 2017, 4 pages.

*Primary Examiner* — Salil Jain
(74) *Attorney, Agent, or Firm* — WARNER NORCROSS + JUDD LLP

(57) ABSTRACT

A system for generating a chlorine-containing mixture comprises an anodic chamber comprising an anodic electrode and having an inlet for a first solution and an outlet for an anolyte solution. A cathodic chamber is spaced from and adjacent the anodic chamber in the system. The cathodic chamber comprises a cathodic electrode and has an inlet for a second solution and an outlet for a catholyte solution. The second solution may be the same as or different from the first solution, and at least one of the first and second solutions comprises a chlorinated solution. A membrane is disposed between and separates the anodic chamber and the cathodic chamber. The system further comprises a dilution chamber having an inlet for an aqueous solution and an outlet. Finally, the system comprises a mixing chamber, which has an outlet for the chlorine-containing mixture. The outlet of the dilution chamber is in fluid communication with the mixing chamber. Chlorine gas is generated in the anodic chamber along with the anolyte solution and at least the chlorine gas is combined with the aqueous solution in the mixing chamber. The system allows for a free available chlorine (FAC)

(Continued)

value of the chlorine-containing mixture to be selectively controlled.

15 Claims, 6 Drawing Sheets

(51) Int. Cl.
*C25B 9/19* (2021.01)
*C25B 9/77* (2021.01)
*C25B 15/08* (2006.01)

(56) References Cited

U.S. PATENT DOCUMENTS

| | | | |
|---|---|---|---|
| 2006/0283808 A1* | 12/2006 | Kadlec | C02F 1/76 |
| | | | 210/746 |
| 2009/0008268 A1* | 1/2009 | Salathe | A01N 25/00 |
| | | | 205/746 |
| 2010/0078331 A1* | 4/2010 | Scherson | C25B 1/26 |
| | | | 205/335 |
| 2011/0135562 A1 | 6/2011 | Niksa et al. | |
| 2012/0085657 A1* | 4/2012 | Bhavaraju | C25B 13/04 |
| | | | 205/351 |
| 2012/0168319 A1 | 7/2012 | Iltsenko et al. | |
| 2013/0146473 A1 | 6/2013 | Lambert et al. | |
| 2014/0026971 A1* | 1/2014 | Roach | C02F 1/008 |
| | | | 137/3 |
| 2014/0202871 A1* | 7/2014 | Lumetta | C25B 9/18 |
| | | | 205/337 |
| 2014/0209454 A1* | 7/2014 | Ishii | A01N 59/00 |
| | | | 204/229.6 |
| 2014/0318981 A1 | 10/2014 | Buitendag et al. | |

\* cited by examiner

SYSTEM AND METHOD FOR GENERATING A CHLORINE-CONTAINING MIXTURE

CROSS-REFERENCE TO RELATED APPLICATIONS

This application is the National Stage of International Application No. PCT/US2016/055891 filed on 7 Oct. 2016, which claims priority to and all advantages of US Provisional Patent Appl. No. 62/238,268 filed on 7 Oct. 2015, the content of which is hereby incorporated by reference.

FIELD OF THE INVENTION

The present invention generally relates to a system for generating a chlorine-containing mixture and, more specifically, to a system for generating a chlorine-containing mixture having a selectively controlled free available chlorine (FAC) value.

DESCRIPTION OF THE RELATED ART

Chlorine-containing compounds and mixtures are well known in the art and are utilized in various industries due to their unique physical properties. For example, chlorine-containing compounds are utilized in cleaning applications. More specifically, hospitals, restaurants, and even households often employ various chlorine-containing compounds for disinfecting, bleaching, whitening, deodorizing, and/or otherwise cleaning substrates.

For example, one chlorine-containing compound is sodium hypochlorite (NaClO), which is utilized as a powerful disinfecting agent and/or a bleaching agent. Sodium hypochlorite is commonly referred to as bleach when disposed in water to form an aqueous sodium hypochlorite solution. Another chlorine-containing compound is hypochlorous acid (HClO), which is similarly utilized as a disinfecting agent. Further still, chlorine ($Cl_2$) dissolved in water can be utilized for similar purposes.

SUMMARY OF THE INVENTION

The present invention provides a system for generating a chlorine-containing mixture. The system comprises an anodic chamber comprising an anodic electrode and having an inlet for a first solution and an outlet for an anolyte solution. A cathodic chamber is spaced from and adjacent the anodic chamber in the system. The cathodic chamber comprises a cathodic electrode and has an inlet for a second solution and an outlet for a catholyte solution. The second solution may be the same as or different from the first solution, and at least one of the first and second solutions comprises a chlorinated solution. A membrane is disposed between and separates the anodic chamber and the cathodic chamber. The system further comprises a dilution chamber having an inlet for an aqueous solution and an outlet. Finally, the system comprises a mixing chamber, which has an outlet for the chlorine-containing mixture. The outlet of the dilution chamber is in fluid communication with the mixing chamber. Chlorine gas is generated in the anodic chamber along with the anolyte solution and at least the chlorine gas is combined with the aqueous solution in the mixing chamber. The system allows for a free available chlorine (FAC) value of the chlorine-containing mixture to be selectively controlled.

The present invention also provides a method of a chlorine-containing mixture in the system. The method comprises the step of disposing the first solution in the anodic chamber and the second solution in the cathodic chamber. The method further comprises applying a potential difference between the anodic electrode and the cathodic electrode such that the anolyte solution is formed from the first solution and the catholyte solution is formed from the second solution. In the method, chlorine gas is generated in the anodic chamber along with the anolyte solution. In the method, at least the chlorine gas is combined with the aqueous solution in the mixing chamber, and a free available chlorine value of the chlorine-containing mixture may be selectively controlled via the system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
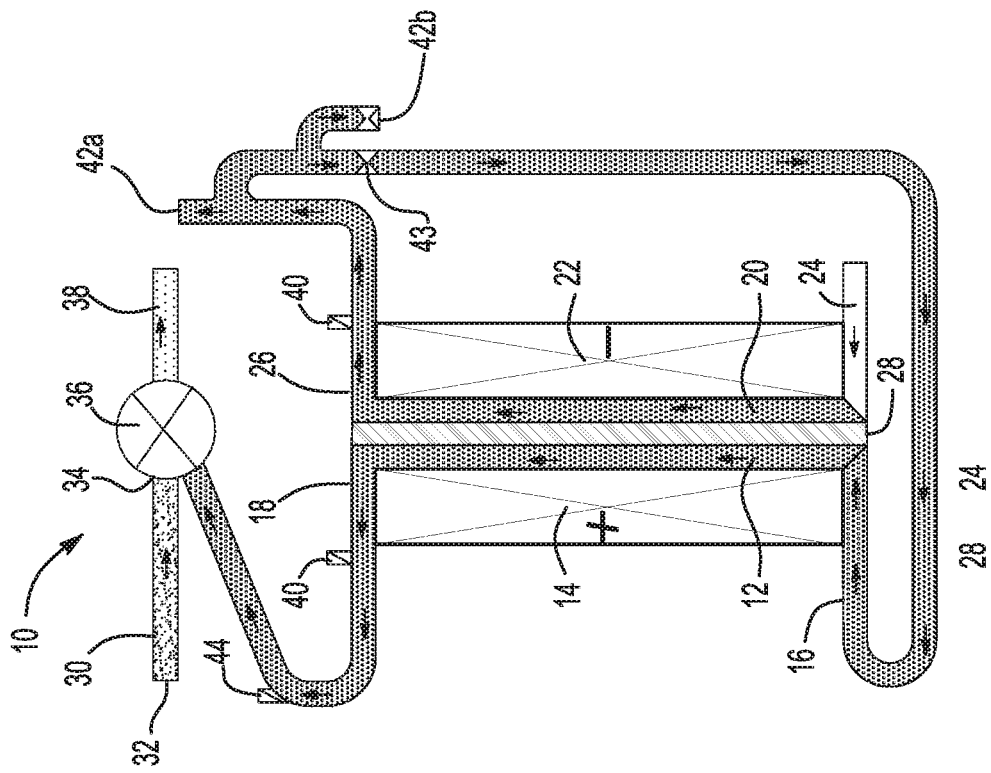
FIG. 1 is a schematic view of one embodiment of a system for generating a chlorine-containing mixture according to the present invention.

Referring to the Figures, wherein like numerals indicate corresponding parts throughout the several views, a system for generating a chlorine-containing mixture is generally shown at 10. The system 10 is particularly suitable for generating a chlorine-containing compound for various end use applications, e.g. disinfecting and/or sanitizing a substrate, disinfecting water, for example in fracking wells, etc. However, the system 10 is suitable for generating a chlorine-containing compound for other applications, such as for sanitizing water for a pool, a hot tub, etc. A method of generating the chlorine-containing mixture with the system 10 is also disclosed.

As introduced above, the system 10 is for generating a chlorine-containing mixture. The system 10 is configured such that the desired chlorine-containing mixture can be selectively controlled. The chlorine-containing mixture may be a mixture of chlorine gas ($Cl_2$) dissolved in or present with a fluid, e.g. water. For example, the chlorine-containing mixture may comprise chlorine gas dissolved in water. Alternatively, the chlorine-containing mixture may comprise a chlorine-containing compound in addition to chlorine gas itself. In these embodiments, the chlorine-containing compound generated by the system 10 of the present invention may comprise any chlorine-containing compound having desirable physical properties, such as sanitizing and/or disinfecting properties. Typically, the chlorine-containing compound is selected from chlorine-containing compounds that may be generated from a chloride salt solution, e.g. an aqueous sodium chloride (NaCl) solution, as described in greater detail below. Alternatively, the chloride salt solution may be formed from other chlorine-containing salts. Suitable chlorine-containing salts include metal chlorides, specifically alkali metal chlorides and alkaline-earth chlorides. For example, the chloride salt solution may comprise an aqueous calcium chloride ($CaCl_2$) solution, an aqueous magnesium chloride ($MgCl_2$) solution, an aqueous potassium chloride (KCl) solution, etc., or combinations of such solutions. Exemplary examples of chlorine-containing compounds which may be generated by the system 10 from the chloride salt solution include, but are not limited to, hypochlorous acid (HClO), hydrochloric acid (HCl), and sodium hypochlorite (NaClO). Depending on a configuration of the system 10, chlorine-containing compounds maybe generated via the system 10 separate from the chlorine-containing mixture, and the chlorine-containing compounds may be separately collected and/or utilized. For example, depending on a configuration of the system 10, the chlorine-containing mixture may comprise chlorine gas dissolved in water, although hypochlorous acid and sodium hypochlorite are separately generated via the system 10. In this example, the hypochlorous acid and sodium hypochlorite, which are chlorine-containing compounds, may be present in the chlorine-containing mixture, or may be separate from the chlorine-containing mixture. In latter embodiments, the chlorine-containing compounds may be utilized independent and separately from the chlorine-containing mixture, providing additional advantages and versatility of the system 10.

The system 10 comprises an anodic chamber 12. The anodic chamber 12 of the system 10 comprises an anodic electrode 14, as described in greater detail below. Additionally, the anodic chamber 12 of the system 10 has an inlet 16 and an outlet 18. The inlet 16 of the anodic chamber 12 is for receiving a first solution and the outlet 18 of the anodic chamber 12 is for an anolyte solution formed in the anodic chamber 12 from the first solution, as described below. The anodic chamber 12 of the system 10 may have any uniform or non-uniform shape and may have any dimensions depending upon the desired size and shape of the system 10. Similarly, the inlet 16 and the outlet 18 of the anodic chamber 12 may have various configurations, shapes, and dimensions. Typically, the inlet 16 and the outlet 18 of the anodic chamber 12 have substantially identical dimensions to allow for consistent fluid flow in the inlet 16 and out of the outlet 18 of the anodic chamber 12. The anodic chamber 12 typically comprises a polymeric material, which houses the anodic electrode 14 and defines the inlet 16 and the outlet 18. Exemplary examples of the polymeric material of the anodic chamber 12 include, but are not limited to, acrylonitrile butadiene styrene (ABS), polystyrene, polyvinylchloride, polycarbonate, polyethylene, polypropylene, etc.

The system 10 further comprises a cathodic chamber 20. The cathodic chamber 20 of the system 10 is spaced from and adjacent the anodic chamber 12. The cathodic chamber 20 of the system 10 comprises a cathodic electrode 22, as described in greater detail below. Additionally, the cathodic chamber 20 of the system 10 has an inlet 24 and an outlet 26. The inlet 24 of the cathodic chamber 20 is for receiving a second solution and the outlet 26 of the anodic chamber 20 is for a catholyte solution formed in the cathodic chamber 20 from the second solution, as described below. Like the anodic chamber 12, the cathodic chamber 20 of the system 10 may have any uniform or non-uniform shape and may have any dimensions depending upon the desired size and shape of the system 10. Typically, the cathodic chamber 20 and the anodic chamber 12 have dimensions such that a volume of the cathodic chamber 20 and a volume of the anodic chamber 12 are substantially identical. However, the volume of the cathodic chamber 20 may be larger or smaller than the volume of the anodic chamber 12. Similarly, the cathodic chamber 20 and the anodic chamber 12 may have shapes different from one another, or shapes similar or identical to one another. Further, the inlet 24 and the outlet 26 of the cathodic chamber 20 may have various configurations, shapes, and dimensions. Typically, the inlet 24 and the outlet 26 of the cathodic chamber 20 have substantially identical dimensions to allow for consistent fluid flow in the inlet 24 and out of the outlet 26 of the cathodic chamber 20. The cathodic chamber 20 typically comprises a polymeric material, which houses the cathodic electrode 22 and defines the inlet 24 and the outlet 26. The cathodic chamber 20 may comprise the same polymeric material as the anodic chamber 12 or may comprise polymeric material different from the polymeric material of the anodic chamber 12. Exemplary examples of the polymeric material of the cathodic chamber 20 include, but are not limited to, acrylonitrile butadiene styrene (ABS), polystyrene, polyvinylchloride, polycarbonate, polyethylene, polypropylene, etc.

The anodic electrode 14 of the anodic chamber 12 of the system 10 and the cathodic electrode 22 of the cathodic chamber 20 of the system 10 may independently comprise any conductive or semi-conductive material. Generally, the anodic electrode 14 of the anodic chamber 12 of the system 10 and the cathodic electrode 22 of the cathodic chamber 20 of the system 10 are independently selected from metals, semi-metals, metal alloys, conductive or semi-conductive composites, and combinations thereof. Specific examples of exemplary conductive and/or semi-conductive materials suitable for the purposes of the anodic electrode 14 of the anodic chamber 12 and the cathodic electrode 22 of the cathodic chamber 20 include, but are not limited to, carbon (e.g. graphite), titanium, titanium alloys, nickel, nickel alloys, steel, and steel alloys. In certain embodiments, at least one of the anodic electrode 14 of the anodic chamber 12 of the system 10 and the cathodic electrode 22 of the cathodic chamber 20 of the system 10 comprises graphite or a similar conductive carbon-based material. For example, the conductive carbon-based material may comprise a conductive allotrope of carbon or a conductive composite including carbon. In other embodiments, both the anodic electrode 14 of the anodic chamber 12 of the system 10 and the cathodic electrode 22 of the cathodic chamber 20 of the system 10 comprise graphite. Because the cathodic electrode 22 does not suffer from ablation during use of the system 10, the cathodic electrode 22 may comprise a material other than graphite, such as a metal or alloy, to minimize costs of the system 10, even when the anodic electrode 14 comprises graphite or a similar conductive carbon-based material.

In specific embodiments, the anodic electrode 14 of the anodic chamber 12 generally comprises a dimensionally stable anode or carbon, e.g. graphite. Typically, impurities associated with electrolytes cover the anodic electrode 14 over time or erode an active surface area of the dimensionally stable anode. However, carbon does not suffer from this limitation. In fact, carbon may ablate over time when utilized as the anodic electrode 14, thus providing a self-cleaning benefit in addition to significantly reduced cost as compared to conventional dimensionally table anodes. In these or other embodiments, the cathodic electrode 22 of the cathodic chamber 20 comprises carbon, a dimensionally stable anode, iron, or nickel. In specific embodiments, the cathodic electrode 22 of the cathodic chamber 20 comprises carbon. When both the cathodic and anodic electrodes 22, 14 comprise carbon, the system 10 may be configured to reverse polarity of the cathodic and anodic electrodes 22, 14, which also imparts longevity and self-cleaning properties to the cathodic and anodic electrodes 22, 14 of the system 10.

When the cathodic and anodic electrodes 22, 14 comprise carbon, the cathodic and anodic electrodes 22, 14 may not interface well with metallic conductive contacts. In certain embodiments, a contact area of the cathodic and anodic electrodes 22, 14 is laminated with a metallic contact member (not shown), which may be bonded to the cathodic and anodic electrodes 22, 14 via a conductive adhesive. Alternatively, a metallic plate, e.g. a copper plate, may be disposed or deposited on an exterior portion of the cathodic and/or anodic electrodes 22, 14.

The system 10 also comprises a membrane 28 disposed between and separating the anodic chamber 12 and the cathodic chamber 20. The membrane 28 may be referred to as a separator. Generally, the membrane 28 is the only material separating the anodic chamber 12 and the cathodic chamber 20 in the system 10. The membrane 28 of the system 10 may comprise any material capable of allowing ions to pass therethrough, as described in greater detail below. Accordingly, the membrane 28 of the system 10 is typically at least partially porous. However, the membrane 28 of the system 10 typically substantially prevents fluid from passing therethrough. Additionally, the membrane 28 of the system 10 typically comprises a material which is resistant to and which doesn't readily degrade in the presence of acidic and/or alkaline compounds.

In certain embodiments, the membrane 28 comprises a dielectric material. In these or other embodiments, the membrane 28 comprises a polymeric material. Alternatively, the membrane 28 may comprise a ceramic or ion selective material. Specific examples of materials suitable for the purposes of the membrane 28 of the system 10 include, but are not limited to, polyethylene, polypropylene, polyvinylchloride, cellulose, polyethersulfones (PES), glass fiber, polytetrafluoroethylene (PTFE), chlorinated polyvinyl chloride (CPVC), polyvinylidene fluoride (PVDF), etc. The material may be compounded with various additives, e.g. hydrophilic additives, to modify physical properties of the resulting membrane 28. For example, hydrophilic additives may aid with migration of ions through the membrane 28 and wetting of pores of the membrane 28, as the membrane 28 may otherwise be hydrophobic and lead to beading of adjacent liquid. The membrane 28 may comprise a combination of different types of materials selected for difference purposes, e.g. the membrane 28 may be a composite.

In certain embodiments, the anodic chamber 12, the cathodic chamber 20 and the membrane 28 together form single cartridge that may be removed and replaced in the system 10. Specifically, the single cartridge is configured to be engageable and disengageable from the system 10 such that the single cartridge may be replaced within the system 10 by a user, thus providing longevity to the system 10 through use of such single cartridges over time. In these embodiments, the anodic chamber 12, the cathodic chamber 20 and the membrane 28 may be referred to as a disposable cartridge. Additionally, in these embodiments, the disposable cartridge may be easily replaced within the system 10 for a minimal cost, particularly when the anodic electrode 14 of the anodic chamber 12 and the cathodic electrode 22 of the cathodic chamber 20 comprise graphite.

The system 10 further includes a dilution chamber 30 having an inlet 32 and an outlet 34. The inlet 32 of the dilution chamber 30 is for receiving an aqueous solution. The aqueous solution comprises water. The aqueous solution typically comprises water in an amount of at least 80, alternatively at least 85, alternatively at least 90, alternatively at least 95, alternatively at least 96, alternatively at least 97, alternatively at least 98, alternatively at least 99, alternatively 100, weight percent based on the total weight of the aqueous solution. The aqueous solution may comprise water in an amount as low as 70 weight percent based on the total weight of the aqueous solution, particularly when the aqueous solution comprises the anolyte solution, as described below. If desired, the aqueous solution may include additives, e.g. dissolved compounds. However, the aqueous solution typically consists essentially of or consists of water. The water may be originate from any source, and may optionally be filtered, e.g. by filtration, reverse-osmosis, distillation, etc. Alternatively, the water may be tap water. In the system, the aqueous solution passes through the outlet 34 of the dilution chamber 30. Generally, the aqueous solution has a constant rate in the inlet 32 of the dilution chamber 30 and through the outlet 34 thereof.

In certain embodiments, the dilution chamber 30 may be an extension of the outlet 18, 26 of the anodic chamber 12 or cathodic chamber 20, respectively. In these embodiments, the anolyte solution and/or the catholyte solution serve as the aqueous solution of the dilution chamber 30, and the inlet 32 for the aqueous solution is in fluid communication with and indistinguishable from the outlet 18, 26 of the anodic chamber 12 or cathodic chamber 20, respectively. Generally, however, the dilution chamber 30 is for introducing fresh aqueous solution and to selectively control a free available chlorine (FAC) value of the chlorine-containing mixture, as described below.

The system 10 further comprises a mixing chamber 36. The mixing chamber 36 has an outlet 38 for the chlorine-containing mixture. The outlet 34 of the dilution chamber 30 is in fluid communication with the mixing chamber 36. The mixing chamber 36 is separate from and external to the anodic chamber 12 and the cathodic chamber 20 of the system 10. As described in detail below, the system 10 generates chlorine gas in the anodic chamber 12, which is present in or with the anolyte solution. At least the chlorine gas is combined with the aqueous solution in the mixing chamber 36. When the aqueous solution is water, the chlorine-containing mixture may be chlorine gas dissolved in water. However, when the aqueous solution is for example the anolyte solution, additional chlorine-containing compounds may also be present in the chlorine-containing mixture along with the chlorine gas. The outlet 18 of the anodic chamber 12 and/or the outlet 26 of the cathodic chamber 20 may optionally be in fluid communication with the mixing chamber 36. A free available chlorine (FAC) value of the chlorine-containing mixture may be selectively controlled via the system 10.

During use of the system 10, the first solution is received in the anodic chamber 12 and the second solution is received in the cathodic chamber 20. Flow rates may be controlled via a valve, flow restrictor, or pump at the inlet 16 of the anodic chamber 12 and the inlet 24 of the cathodic chamber 20. The first solution and the second solution may be the same as or different from one another. At least one of the first and second solutions comprises a chlorinated solution. By chlorinated solution, it is meant that at least one of the first and second solutions comprises chlorine-containing compounds, such as chlorine-containing salts, or chlorine ions from disassociated chlorine-containing salts. Typically, each of the first and second solutions comprises a chlorinated solution. However, because ions may permeate the membrane 28, only one of the first and second solutions need be a chlorinated solution, with the other of the first and second solutions being an aqueous solution, e.g. water. The chlorinated solution is introduced above as an chloride salt solution. The chlorinated solution may be formed in situ or may be obtained or provided. For example, the system 10 may include a metal salt which is dissolved to give the chlorinated solution in situ as water is fed to the anodic chamber 12 and the cathodic chamber 20, respectively. The water utilized in the first and second solutions may advantageously be from any source, including from a natural source (e.g. a lake, a river), municipal water, etc. If desired, the water of the first and second solutions may be pre-treated to remove any contaminants or impurities therefrom. However, unlike conventional systems, no pre-treatment of any water is needed, thus providing significant flexibility of the system 10 based on geography and available water sources.

In certain embodiments, each of the first and second solutions comprises a chlorinated solution. Typically, the chlorinated solution is a chloride salt solution formed by dissolving a chloride salt, e.g. sodium chloride, in water, which may be done prior to feeding the first and second solutions to the system 10 and/or in situ in the system 10. Typically, a concentration of the chlorinated solution is at least 1, alternatively at least 2, alternatively at least 3, alternatively at least 4, alternatively at least 5, alternatively at least 6, alternatively at least 7, alternatively at least 8, alternatively at least 9, wt. % of the chloride salt based on the total weight of the chlorinated solution prior to any ion separation of the chloride salt in the chlorinated solution. Combinations of different chloride salts may be utilized together. Unlike conventional systems, the system 10 may utilize particularly high concentrations of the chlorinated solution, e.g. 9 wt. %. However, the system 10 is not limited to such concentrations and may be utilized in various geographies, e.g. where ocean water may be utilized as the chlorinated solution, which has a concentration of roughly 3 wt. %.

Various embodiments of the system 10 with reference to the Figures are described below. These embodiments are merely exemplary embodiments of the system 10. Various features amongst the embodiments are contemplated to be combined with one another even if not expressly illustrated. For example, certain features, optional components, etc. which are illustrated in specific Figures are applicable to any and all embodiments of the system 10.

As shown in FIG. 1, the anodic and cathodic chambers 12, 20 are substantially parallel to one another and sandwich the membrane 28 therebetween. Arrows indicate the direction of fluid flow. The embodiment of FIG. 1 does not include any recirculation or recycling of the anolyte solution or the catholyte solution. Instead, the outlet 18 of the anodic chamber 12 and the outlet 26 of the cathodic chamber 20 are each in fluid communication with the mixing chamber 36. As such, the mixing chamber 36 is in fluid communication with the outlet 34 of the dilution chamber 30, the outlet 26 of the cathodic chamber 22, and the outlet 18 of the anodic chamber 12. The outlet 26 of the cathodic chamber 20 defines an aperture 42a. The aperture 42a of the outlet 26 of the cathodic chamber 20 is for optional removal of hydrogen gas and at least some of the catholyte solution. Generally, it is desirable to remove hydrogen gas from the catholyte solution prior to the catholyte solution entering the mixing chamber. Each of the outlets 18, 26 of the anodic and cathodic chambers 12, 20, respectively, includes a fill sensor 40 in the embodiment of FIG. 1. The fill sensor 40 detects a presence of the first and second solutions in the anodic and cathodic chambers 12, 20, respectively. In various embodiments, the system 10 is configured to apply a potential difference between the anodic electrode 14 and the cathodic electrode 22 when the fill sensor(s) 40 detects the presence of the first and second chlorine solutions in the anodic and cathodic chambers 12, 20, respectively.

In the embodiment of FIG. 1, the outlet 18 of the anodic chamber 12 includes a flow detector 44 optionally in communication with the fill sensor(s) 40. The flow detector 44 and the system 10 are configured to selectively inhibit generation of chlorine gas in the anodic chamber 12 until a predetermined time, e.g. when adequate flow is achieved. The gas utilized may be any gas and may be inert. The gas may be air or may be recycled gas generated from the system 10, such as hydrogen gas or chlorine gas captured and recycled for this purpose.

When the system 10 is in use, a biasing of pressure on the outlet 18, 26 of the anodic chamber or cathodic chamber 12, 20, respectively, may force the membrane 28 based on relative pressures. For example, if the anodic chamber 12 has a higher pressure than the cathodic chamber 20, the membrane 28 may be slightly displaced away from the anodic electrode 14 toward the cathodic electrode 22. This displacement can minimize erosion of the anodic and cathodic electrodes 14, 22 and the membrane 28 and impart longevity to the system 10.

A free available chlorine (FAC) value of the chlorine-containing mixture may be selectively controlled via the system 10. In particular, the FAC value may be selectively controlled by selecting a volume of the aqueous solution utilized in the dilution chamber 30 in view of a chlorine gas concentration in the anolyte solution. Similarly, the FAC value and presence of chlorine-containing compounds may also be selectively controlled by selecting an amount of the catholyte solution to be recovered via the aperture 42a versus the catholyte solution to be fed to the mixing chamber 36.

Depending on whether 0 to 100% of the catholyte solution is fed to the mixing chamber 36, the chlorine-containing mixture recovered from the outlet 28 of the mixing chamber 36 may have a pH ranging from 1 to 14, alternatively from 2 to 9.5. If for example 60% by weight of the catholyte solution is fed to the mixing chamber 36, and 40% by weight of the catholyte solution is recovered via the aperture 42a, the chlorine-containing mixture comprises chlorine gas, water, hypochlorous acid, and other compounds and ions contingent on the chloride salt utilized in the first and/or second solutions.

Notably, in FIG. 1, the outlet 18 of the anodic chamber 12 is in fluid communication with the mixing chamber 36 such that the chlorine-containing mixture comprises the anolyte solution. However, the chlorine gas may be separated from the anolyte solution via a trap (not shown). In these embodiments, the anolyte solution may be recovered or recycled (after removal of some or all of the chlorine gas via the trap). Alternatively, the anolyte solution may be utilized as the aqueous solution which is combined with the chlorine gas in the mixing chamber 36 to give the chlorine-containing mixture. For example, the trap may separate the chlorine gas from the anolyte solution and feed only the chlorine gas to the mixing chamber 36, where the chlorine gas is combined with and dissolved in the aqueous solution from the dilution chamber 30. The aqueous solution of the dilution chamber 30 may be a fresh feed or may be the anolyte solution after removal of the chlorine gas. In the latter embodiments, the outlet 18 of the anodic chamber 12 is unitary with and not separate from the dilution chamber 30.

Figure 2:
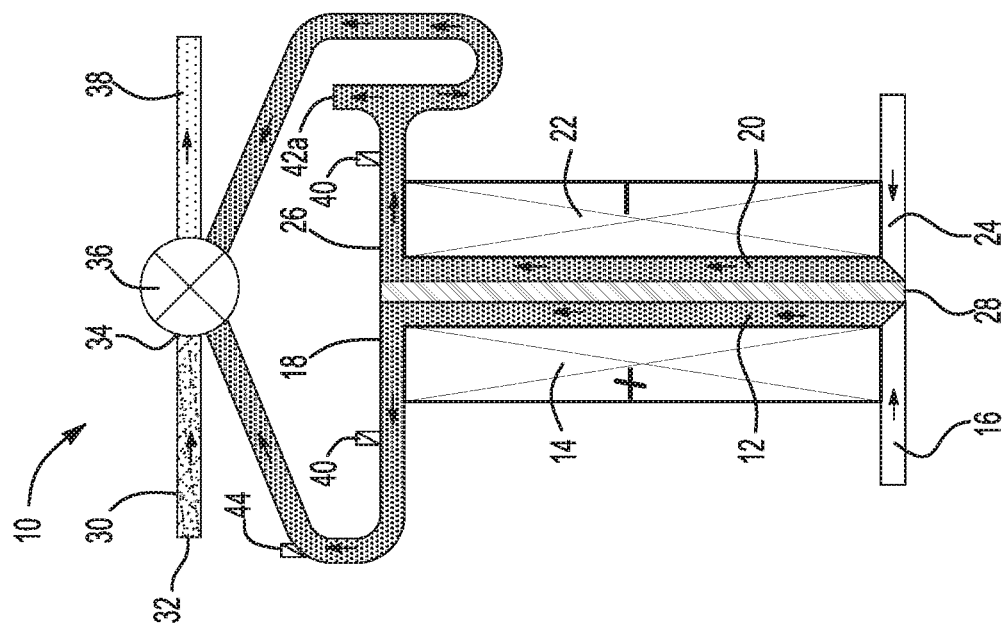
FIG. 2 is schematic view of a second embodiment of the system for generating a chlorine-containing mixture according to the present invention.

FIG. 2 illustrates a modification of the embodiment of FIG. 1 whereby the outlet 26 of the cathodic chamber 20 is in fluid communication with the inlet 16 of the anodic chamber 12 such that at least some of the catholyte solution is recycled. In the embodiment of FIG. 2, the first solution which is fed to the inlet 16 of the anodic chamber 12 is the catholyte solution formed in the cathodic chamber 20. The outlet 26 of the cathodic chamber 20 defines a first aperture 42b for recovering at least some of the catholyte solution and a second aperture 42a for venting hydrogen gas, which may be captured and separately utilized or recycled in the system 10.

Recycling the catholyte solution as the first solution fed to the inlet 16 of the anodic chamber 12 increases a pH of the anolyte solution due to the basic nature (i.e., relative high pH) of the catholyte solution. This configuration also increases a concentration of chlorine gas present in the anolyte solution, which reduces reliance on the mixing chamber 36 to dissolve the chlorine gas into the chlorine-containing solution.

The catholyte solution may be recycled via a pump. Alternatively, the system 10 may be free from such pumps and rely on gas and fluid flow to drive the system 10. For example, the catholyte solution after exiting the cathodic chamber 20 includes hydrogen gas. The cathodic chamber 20 generally has a diameter and dimension such that a fluid therein maintains a meniscus, which results in the gas entraining the liquid in the catholyte solution. This entrainment of the gas in the liquid results in a lower density than the liquid itself, which results in and drives fluid flow. The same is true in regards to the anodic chamber 12 and the gas present in the anolyte solution. The outlet 26 of the cathodic chamber 20 may include a flow restrictor 43, or narrowing of an inner diameter thereof. The flow restrictor 43 can aid fluid flow and when in the cathodic chamber 20 may control the ratio of the catholyte solution which is recovered via the aperture 42b and which is recirculated to the inlet 16 of the anodic chamber 12.

While FIG. 2 illustrates recirculation of the catholyte solution to the inlet 16 of the anodic chamber 12, it is contemplated that the catholyte solution and/or the anolyte solution may be recycled within either or both of the anodic chamber 12 and the cathodic chamber 20. For example, the catholyte solution may be recycled and fed to the inlet 16 of the anodic chamber and/or the inlet 24 of the cathodic chamber 20. Similarly, the anolyte solution may be recycled and fed to the inlet 16 of the anodic chamber and/or the inlet 24 of the cathodic chamber 20. Further still, a fresh feed to the anodic and/or cathodic chambers 12, 20 may be utilized in combination with any recirculation.

The system 10 may include various flow restrictors 43 at various locations. For example, in one embodiment, the system 10 includes a first restrictor (not shown) in the anodic chamber 12 and a second restrictor (not shown) in the cathodic chamber 20 to substantially maintain flow of the first and second solutions, respectively. The flow restrictors 43 may be present at the inlets 16, 24 of the anodic and cathodic chambers 12, 20 and/or at the outlets 18, 26 of the anodic and cathodic chambers 12, 20. This ratio also impacts pH of the anolyte solution and resulting chlorine-containing mixture.

Figure 3:
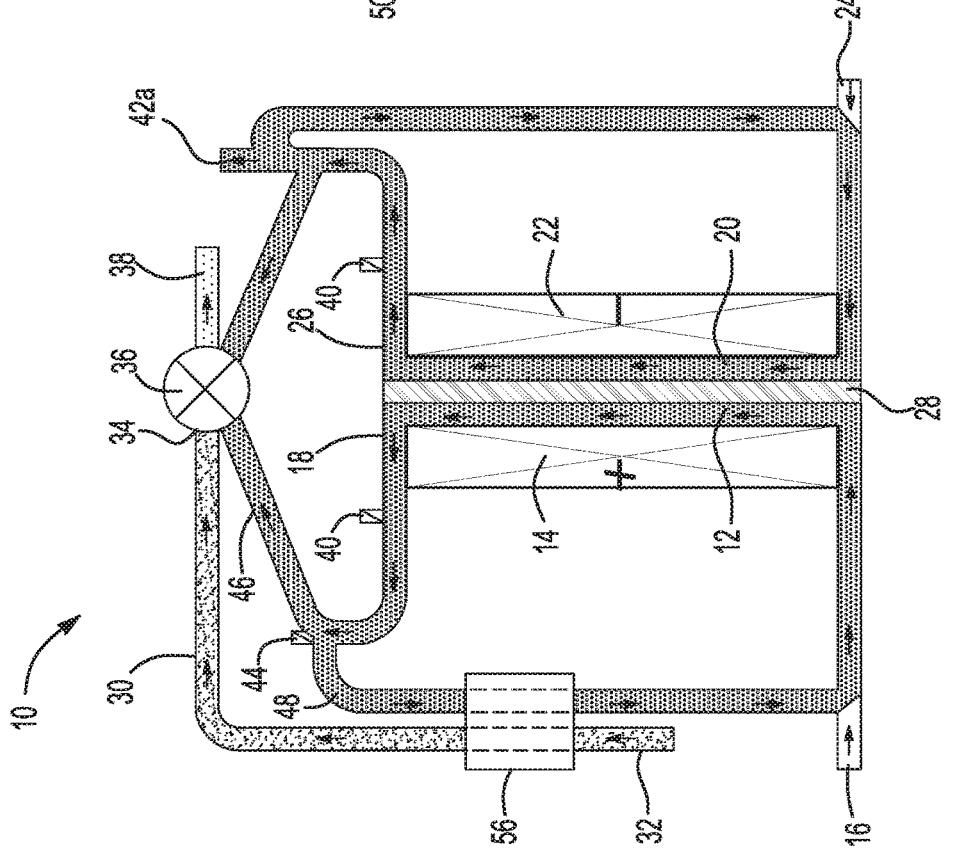
FIG. 3 is a schematic view of a third embodiment of the system for generating a chlorine-containing compound according to the present invention.

FIG. 3 illustrates an embodiment of the system 10 whereby each of the anolyte and catholyte solutions are recirculated. In particular, the outlet 18 of the anodic chamber 12 is in fluid communication with the mixing chamber 36, and the outlet 26 of the cathodic chamber 20 is in fluid communication with the mixing chamber 36, such that at least some of the anolyte solution and at least some of the catholyte solution is combined in the mixing chamber 36 to give the chlorine-containing mixture.

In the embodiment of FIG. 3, the outlet 26 of the cathodic chamber 20 is in fluid communication with the inlet 24 of the cathodic chamber 20 such that at least some of the catholyte solution is recycled and the second solution comprises the catholyte solution. Further, the outlet 26 of the cathodic chamber 20 is in fluid communication with the mixing chamber 36 such that at least some of the catholyte solution is present in the chlorine-containing mixture.

Further, in the embodiment of FIG. 3, the outlet 18 of the anodic chamber 12 is bifurcated into first and second outlets 46, 48. The first outlet 46 is in fluid communication with the mixing chamber 36 and the second outlet 48 is in fluid communication with the inlet 16 of the anodic chamber 12 such that at least some of the anolyte solution is fed to the mixing chamber 36 and at least some of the anolyte solution is recycled such that the second solution comprises the anolyte solution. If desired, the first outlet 46 may include only the chlorine gas for delivery to the mixing chamber 36, whereas the second outlet 48 includes liquid anolyte solution for recycling in the anodic chamber 12. Alternatively, the first outlet 46 may include chlorine gas and some of the liquid anolyte solution for delivery to the mixing chamber 36. Recycling and recirculation of the anolyte solution within the anodic chamber 12 and the catholyte solution within the cathodic chamber 20 maintains substantially uniform pH and ion concentrations throughout the system 10.

Although in FIG. 3 the anolyte solution is recycled or recirculated within the anodic chamber 12 and the catholyte solution is recycled or recirculated within the cathodic chamber 20, the recycled anolyte solution is combined with a fresh feed at the inlet 16 of the anodic chamber 12 and the recycled catholyte solution is combined with a fresh feed at the inlet 24 of the cathodic chamber 20. The fresh feed introduces fresh chlorinated solution in the first and second solutions, respectively, which are fed to the anodic and cathodic chambers 12, 20. The FAC value of the chlorine-containing mixture is contingent on many variables, such as a ratio of the fresh feed to recycled catholyte and/or anolyte solution, etc.

A heat exchanger 56 is utilized between the dilution chamber 30 and the second outlet 48 of the anodic chamber 12 which carries the recirculated anolyte solution. Electrolysis is exothermic and thus the anolyte solution and the catholyte solution may have an elevated temperature. The heat exchanger 56 may cool the anolyte solution before feeding the anolyte solution to the inlet 16 of the anodic chamber 12. The heat exchanger may utilize the aqueous solution in the dilution chamber 30 or ambient air to cool the anolyte solution. Alternatively, a cooling fluid may be present in or pumped through the heat exchanger 56. The heat exchanger 56 may comprise any suitable material having a desired thermal conductivity. In certain embodiments, the heat exchanger 56 comprises graphite. Use of the heat exchanger 56 allows for the system 10 to operate at reduced fresh feed flows (to be combined with the recycled anolyte solution and recycled catholyte solution), which conserves the chloride salt, reduces cost, and increases longevity of the system 10. More than one heat exchanger 56 may be utilized, and a heat exchanger (not shown) may also be utilized with respect to the recycled catholyte solution. The system 10 may be disposed in the cooling fluid or other fluid for alternative or additional cooling techniques. Alternatively still, the system 10 may include the flow or recirculation of cooling fluid in any location, e.g. along exterior portions of the anodic or cathodic electrodes 14, 22.

Figure 4:
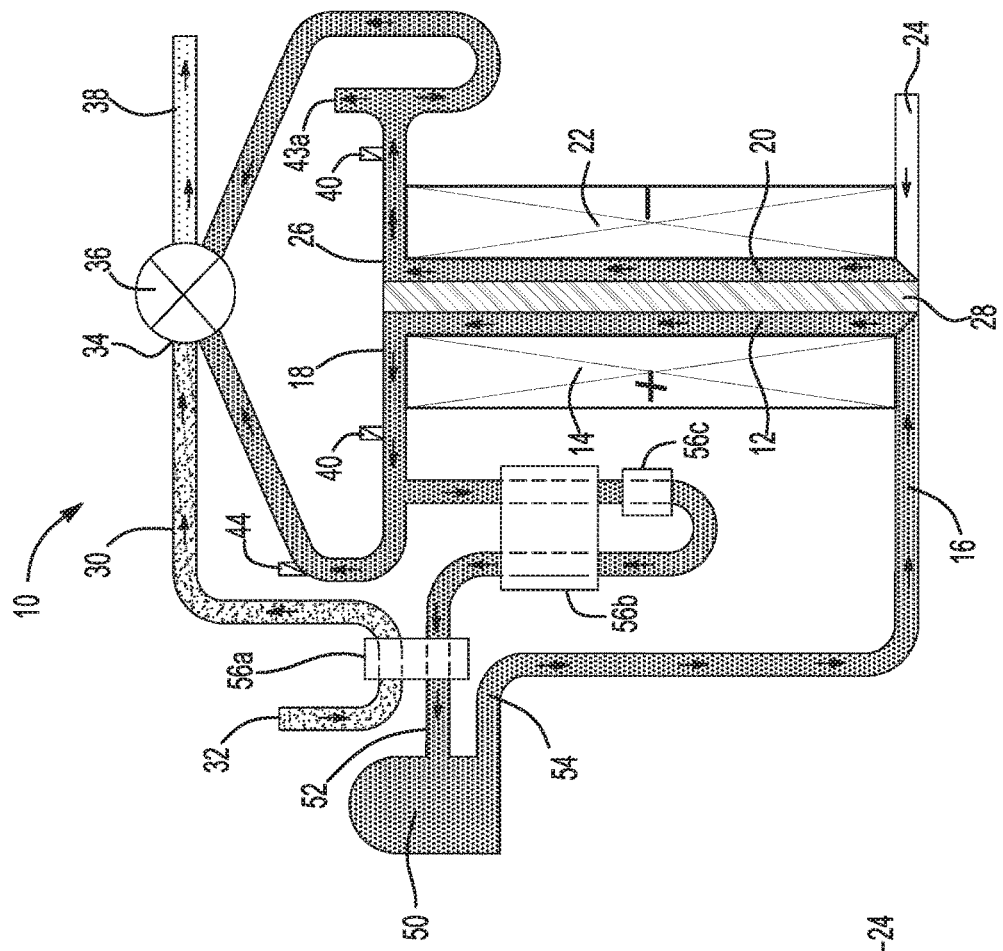
FIG. 4 is a schematic view of a fourth embodiment of the system including a salt tank for generating a chlorine-containing compound according to the present invention.

FIG. 4 illustrates an embodiment of the system 10 including a salt tank 50. The salt tank 50 has an inlet 52 and an outlet 54. The use of the salt tank 50 reduces any residual chloride salt present in the anolyte solution and the chlorine-containing mixture. In the specific embodiment of FIG. 4, the inlet 16 of the anodic chamber 12 is in fluid communication with the outlet 54 of the salt tank 50. A fresh feed may be combined with the outlet 54 of the salt tank 50 at the inlet 16 of the anodic chamber. However, such a fresh feed is optional, particularly when the system 10 includes the salt tank 50. There is no such fresh feed utilized in the embodiment of FIG. 4. The salt tank 50 may be utilized in embodiments other than that which is exemplified in FIG. 4, e.g. when there is recirculation of the catholyte solution.

As with the embodiment of FIG. 3, in the embodiment of FIG. 4, the outlet 18 of the anodic chamber 12 is bifurcated into first and second outlets 46, 48. The first outlet 46 is in fluid communication with the mixing chamber 36 and the second outlet 48 is in fluid communication with the inlet 52 of the salt tank 50 such that at least some of the anolyte solution is fed to the mixing chamber 36 and at least some of the anolyte solution is fed to the salt tank 50 and recycled. If desired, the first outlet 46 may include only the chlorine gas for feeding to the mixing chamber 36, whereas the second outlet 48 includes liquid anolyte solution for recycling. Alternatively, the first outlet 46 may include chlorine gas and some of the liquid anolyte solution for delivery to the mixing chamber 36.

The salt tank 50 may include the chloride salt in solid form, which may dissolve in the anolyte solution which is fed to the salt tank 50 as the anolyte solution is disposed in or otherwise passes therethrough. The chloride salt from the salt tank 50 increases a concentration of the chloride salt in the first solution fed to the anodic chamber 12 and obviates need for a constant source of chloride solution, as the chloride solution is formed in situ via the salt tank 50. Further, use of the chloride salt in solid form reduces a size or volume of the system 10 which would otherwise be necessary to accommodate larger volumes of chloride solution when not formed in situ.

The embodiment of FIG. 4 also includes first, second and third heat exchangers 56a, 56b, 56c. The first, second and third heat exchangers 56a, 56b, 56c are utilized to selectively heat or cool various fluids and certain locations within the system 10. The first heat exchanger 56a is coupled between the inlet 52 of the salt tank 50 and the dilution chamber 30. The aqueous solution of the dilution chamber 30 is may optionally be heated or cooled, but generally is at or below ambient temperature. In contrast, the anolyte solution passing through the first heat changer 56a while being fed to the brine tank 50 has an elevated temperature. As such, the first heat exchanger 56a typically cools the anolyte solution as it is being fed to the brine thank 50. Reducing a temperature of the anolyte solution via the first heat exchanger increases a saturation point of chlorine gas in the anolyte solution, thus minimizing potential release of chlorine gas from the anolyte solution in the brine thank 50. The third heat exchanger 56c may only be used to transfer heat to the anolyte solution, in which case the third heat exchanger 56c may be referred to as a heater. The second and third heat exchangers 56b, 56c are for scavenging any chlorine gas present in the anolyte solution and to recover the associated heat. For example, when the third heat exchanger 56c is the heater, the second heat exchanger 56b may be a heat recovery heat exchanger to reduce requirements of the heater. Elevating the temperature of the anolyte solution decreases a saturation point of chlorine gas in the anolyte solution, thus maximizing potential release of chlorine gas from the anolyte solution prior to being fed to the brine tank 50 and maximizing the chlorine gas that is fed to the mixing chamber 36. Alternatively or in addition to the second and third heat exchangers 56b, 56c, chlorine desaturation, e.g. via a vibratory pump or acoustic transducer, may be utilized in the system 10 and method for initiating one or more pulses of negative pressure for causing separation of any dissolved chlorine gas present in the anolyte solution which may optionally be captured in the mixing chamber 36.

The embodiments of FIGS. 1-4 are representative of exemplary single cell embodiments of the system 10. However, in certain embodiments, the system 10 may include a two or more cells, i.e., a plurality of cells, as shown in FIGS. 5-9. When the system 10 includes two or more cells, the two or more cells may be configured in a parallel configuration, a series configuration, or combinations or parallel and series configurations. Any of the features disclosed above in regards to the embodiments of FIGS. 1-4 illustrating exemplary single cell configurations of the system 10 are also applicable to the embodiments of FIGS. 5-9 illustrating exemplary multiple cell configurations of the system 10. For example, though not expressly shown, it is contemplated that any of the heat exchangers 56a, 56b, 56b, and/or the salt tank 50, and any other optional features introduced above are contemplated to be also applicable to the embodiment described below.

Figure 5:
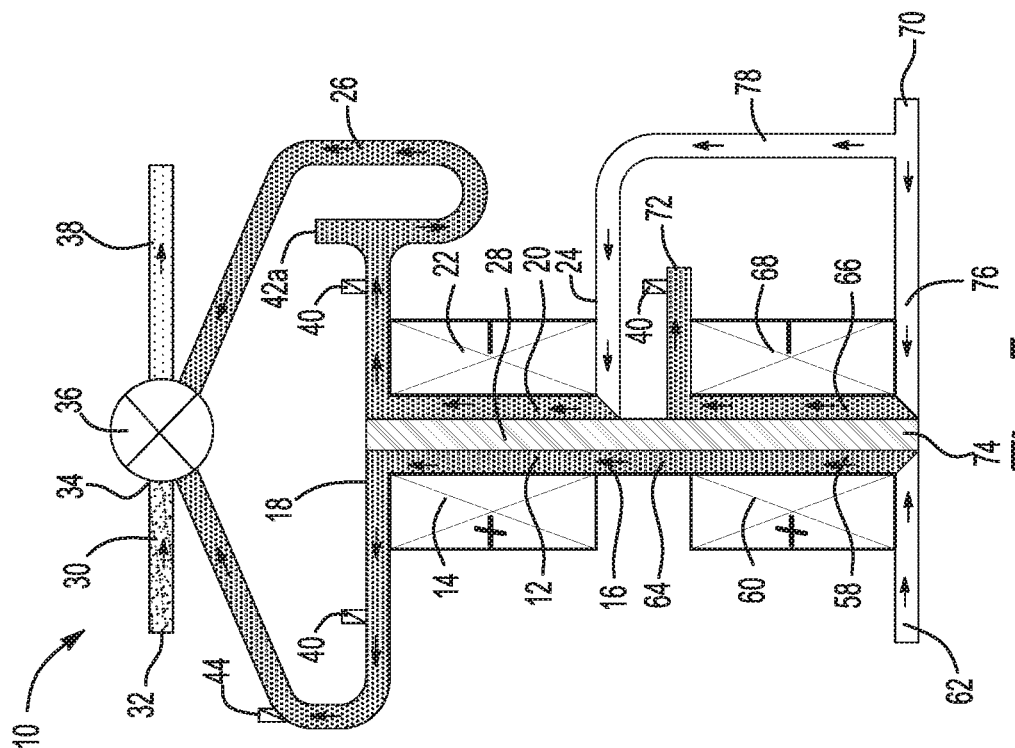
FIG. 5 is a schematic view of a fifth embodiment of the system which includes two cells for generating a chlorine-containing compound according to the present invention.

FIG. 5 illustrates an embodiment of the system 10 including two cells in series, which may be referred to as a dual cell configuration. In the embodiment of FIG. 5, the system 10 further comprises an initial anodic chamber 58 including an initial anodic electrode 60. The initial anodic electrode 60 may be the same as or different from the anodic electrode 14 and is generally selected from the materials disclosed above with regard to the anodic electrode 14. Typically, the initial anodic electrode 60 and the anodic electrode 14 are separate from one another, i.e., the initial anodic electrode 60 and the anodic electrode 14 are not one continuous unitary electrode, although a continuous unitary electrode may be utilized. The initial anodic chamber also includes an inlet 62 and an outlet 64.

In the embodiment of FIG. 5, the system 10 further comprises an initial cathodic chamber 66 including an initial cathodic electrode 68. The initial cathodic electrode 68 may be the same as or different from the cathodic electrode 22 and is generally selected from the materials disclosed above with regard to the cathodic electrode 22. Typically, the initial cathodic electrode 68 and the cathodic electrode 22 are separate from one another, i.e., the initial cathodic electrode 68 and the cathodic electrode 22 are not one continuous unitary electrode, although a continuous unitary electrode may be utilized. The initial cathodic chamber also includes an inlet 70 and an outlet 72.

A initial membrane 74 is disposed between and separates the initial anodic chamber 58 and the initial cathodic chamber 66. The initial membrane 74 may be the same as or different from the membrane 28. Typically, the initial membrane 74 is also independently elected from the materials described above with respect to the membrane 28.

The outlet 64 of the initial anodic chamber 58 is in fluid communication with the inlet 16 of the anodic chamber 16. The initial anodic chamber 58 and the anodic chamber 12 are typically continuous and unitary with substantially constant dimension. Similarly, the initial membrane 74 and the membrane 28 are typically continuous and unitary with substantially constant dimension. The initial membrane 74 and the membrane 28 may be viewed as one continuous membrane.

In the embodiment of FIG. 5, the inlet 70 of the initial cathodic chamber 66 is bifurcated into first and second inlets 76, 78. The first inlet 76 of the initial cathodic chamber 66 is in fluid communication with the initial cathodic chamber 66. The second inlet 78 of the initial cathodic chamber 66 is in fluid communication with the inlet 24 of the cathodic chamber 66. As such, the feed of the second solution is split and fed to each of the inlets 24, 76 of the initial cathodic chamber 66 and the cathodic chamber 20, respectively. A restrictor (not shown) in either or both of the first and second inlets 76, 78 can control fluid flow. Alternatively or in addition, the first and second inlets 76, 78 may be fed via flow control pumps (not shown).

An initial catholyte solution may be recovered and utilized or disposed of from the outlet 72 of the initial cathodic chamber 66. As with the embodiment in FIG. 1, in FIG. 6, the anolyte solution including the chlorine gas is fed to the mixing chamber 36, and at least some of the catholyte solution is also fed to the mixing chamber 36 if not fully recovered from the aperture 42*a*. The first solution fed to the anodic chamber 12 may be referred to as an initial anolyte solution. As such, the first solution fed to the anodic chamber 12 may already include chlorine gas and other ions or chlorine-containing compounds from applying a potential difference between the initial anodic electrode 60 and the initial cathodic electrode 68.

As a potential difference is applied between the initial anodic electrode 60 and the initial cathodic electrode 68, a potential difference is also applied between the anodic electrode 14 and the cathodic electrode 22. The same potential difference may be applied between the initial anodic electrode 60 and the initial cathodic electrode 68 as between the anodic electrode 14 and the cathodic electrode 22, and the same power supply may be utilized. However, in other embodiments, the potential difference and/or current between the initial anodic electrode 60 and the initial cathodic electrode 68 is different from the potential difference and/or current between the anodic electrode 14 and the cathodic electrode 22. In particular, the ratio of the current between the anodic electrode 14 and the cathodic electrode 22 to the current between the initial anodic electrode 60 and the initial cathodic electrode 68 impacts pH of the anolyte solution and the chlorine-containing mixture. For example, as this ratio increases, the pH of the anolyte solution decreases. Said differently, as a greater current is utilized between the anodic electrode 14 and the cathodic electrode 22 as compared to the current utilized between the initial anodic electrode 14 and the initial cathodic electrode 22, the pH of the anolyte solution increases. The sum of the current utilized between the anodic electrode 14 and the cathodic electrode 22 and the current utilized between the initial anodic electrode 60 and the initial cathodic electrode 68 generally dictates the overall chlorine gas production in the anolyte solution.

Figure 6:
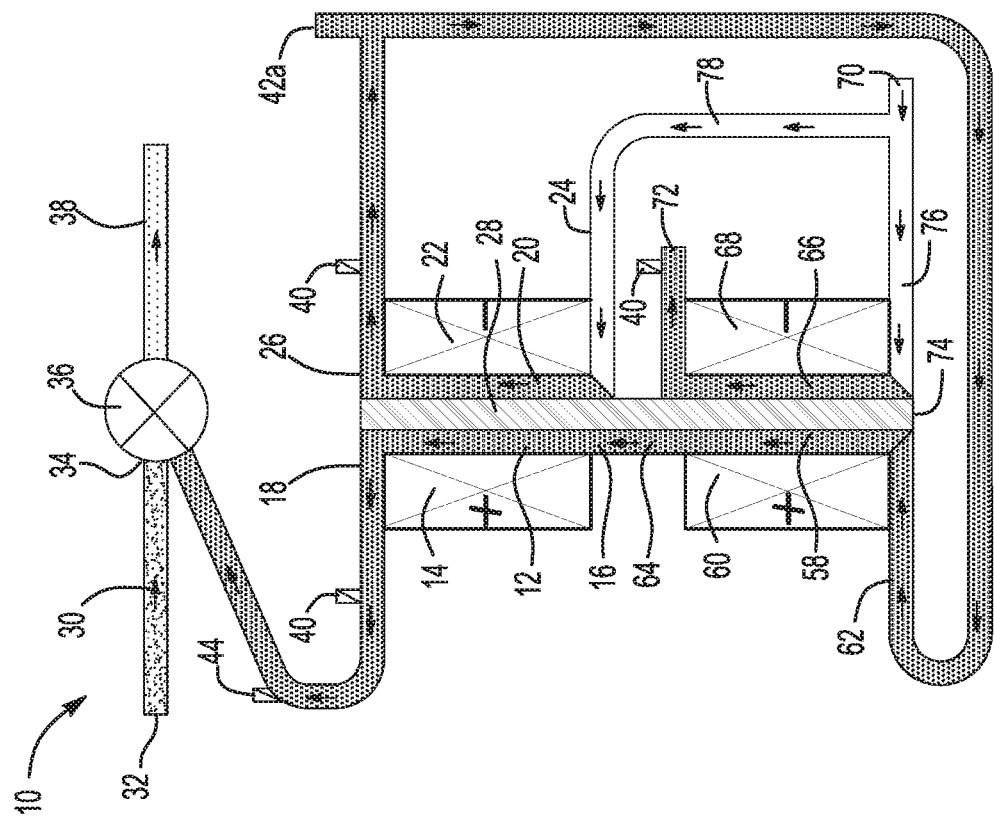
FIG. 6 is a schematic view of a sixth embodiment of the system which also includes two cells for generating a chlorine-containing compound according to the present invention.

FIG. 6 illustrates a dual cell configuration similar to that of FIG. 5 but with a recirculation of the catholyte solution to the initial anolyte chamber 58. In the embodiment of FIG. 6, the outlet 26 of the cathodic chamber 20 defines the aperture to vent hydrogen gas. The outlet 26 of the cathodic chamber 20 is in fluid communication with the inlet 62 of the initial anodic chamber 58. As such, the catholyte solution, after venting hydrogen, is fed to the initial anodic chamber 58. The catholyte solution is not fed to the mixing chamber 36 in this embodiment. However, at least some of the catholyte solution may be fed to the mixing chamber and at least some of the catholyte solution may be fed to the inlet 62 of the initial anodic chamber 58. The amount of the catholyte solution which is recycled and fed to the initial anodic chamber 58 may be determined based on the relative flow of fluid through the first and second inlets 76, 78, as only the second solution fed to through the inlet 78 in fluid communication with the inlet 24 of the cathodic chamber 20 which is ultimately recycled. The second solution which is fed to the inlet 76 of the initial cathodic chamber 66 is recovered via the outlet 72 of the initial cathodic chamber.

Recirculation or recycling of the catholyte solution as shown in FIG. 6 increases pH of the fluid in the initial anodic chamber 58 and anodic chamber 12 as compared to utilizing a fresh feed of the first solution. As this pH is increased, absorbed chlorine gas in the anolyte solution also increases, and a saturation point of the chlorine gas is also increased.

Figure 7:
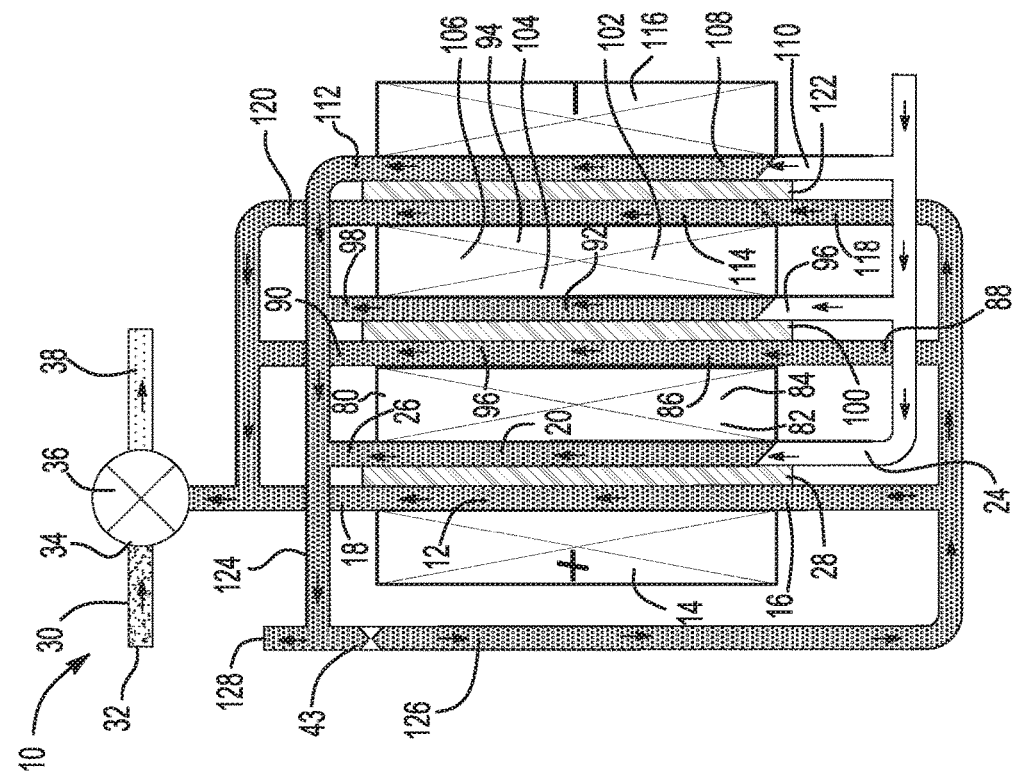
FIG. 7 is a schematic view of a seventh embodiment of the system including a plurality of adjacent cells for generating a chlorine-containing compound according to the present invention.

FIG. 7 illustrates a multiple cell configuration of the system 10. In the embodiment of FIG. 7, the cathodic electrode of the cathodic chamber 20 is further defined as a bipolar electrode 80 having a cathodic portion 82 an anodic portion 84 opposite the cathodic potion 82. The cathodic portion 82 and the anodic portion 84 of the bipolar electrode 80 are typically substantially similar in dimension. Further, as introduced above with respect to the cathodic electrode 22, the bipolar electrode 80 may comprise graphite such that both the anodic portion 84 of the bipolar electrode 80 and the cathodic portion 82 of the bipolar electrode 80 comprises graphite.

The system 10 in the embodiment of FIG. 7 further comprises a second anodic chamber 86 comprising the anodic portion 84 of the bipolar electrode 80 and having an inlet 88 and an outlet 90. The second anodic chamber 86 is typically substantially similar to the anodic chamber 12 in terms of dimension and material. When the system 10 further comprises the second anodic chamber 86, the system typically further comprises a second cathodic chamber 92 spaced from and adjacent the second anodic chamber 86. The second cathodic chamber 92 comprises a second cathodic electrode 94 and has an inlet 96 an outlet 98. A second membrane 100 is disposed between and separates the second anodic chamber 86 and the second cathodic chamber 92. The second cathodic chamber 92 is typically substantially similar to the cathodic chamber 20 in terms of dimension and material.

The system 10 described immediately above, which includes the second anodic chamber 85 and the second cathodic chamber 92, is a dual cell system. However, the system 10 when in a multiple cell configuration may include more than two cells, as shown in FIG. 7.

For example, in the embodiment of FIG. 7, the second cathodic electrode 94 of the second cathodic chamber 92 is further defined as a second bipolar electrode 102 having a cathodic portion 104 and an anodic portion 106 opposite the cathodic potion 104. The system 10 in this embodiment further comprises a third anodic chamber 114 comprising the anodic portion 106 of the second bipolar electrode 102 and having an inlet 118 and an outlet 120. When the system 10 comprises the third anodic chamber 114, the system 10 typically further comprises a third cathodic chamber 108 spaced from and adjacent the third anodic chamber 114. The third cathodic chamber 108 comprises a third cathodic electrode 116 and has an inlet 110 an outlet 112. A third membrane 122 is disposed between and separates the third anodic chamber 114 and the third cathodic chamber 108.

The cathodic portion 104 and the anodic portion 106 of the second bipolar electrode 102 are typically substantially similar in dimension. Further, as introduced above with respect to the cathodic electrode 22, the second bipolar electrode 102 may comprise graphite such that both the anodic portion 106 of the second bipolar electrode 102 and the cathodic portion 106 of the second bipolar electrode 102 comprises graphite. The third anodic chamber 114 is typically substantially similar to the anodic chamber 12 in terms of dimension and material, and the third cathodic chamber 108 is typically substantially similar to the cathodic chamber 20 in terms of dimension and material. Even if the third anodic chamber 114 is substantially similar to the anodic chamber 12 and the third cathodic chamber 108 is typically substantially similar to the cathodic chamber 20, the material thereof may be independently selected.

In the embodiment of FIG. 7, the second solution is fed to the inlets 24, 96, 110 of the cathodic chamber 20, the second cathodic chamber 92 and the third cathodic chamber 108. The outlets 18, 90, 120 of the anodic chamber 12, the second anodic chamber 86, and the third anodic chamber 114 are in fluid communication with the mixing chamber 36. The outlets 18, 90, 120 of the anodic chamber 12, the second anodic chamber 86, and the third anodic chamber 114 may be combined into a single feed which is in fluid communication with the mixing chamber 36, or the outlets 18, 90, 120 of the anodic chamber 12, the second anodic chamber 86, and the third anodic chamber 114 may individually be in fluid communication with the mixing chamber 36. The anolyte solution may be combined in the mixing chamber 36 with the aqueous solution from the dilution chamber 30. Alternatively, the chlorine gas may be separated from the anolyte solution (e.g. via the trap, not shown) such that only the chlorine gas is combined with the aqueous solution in the dilution chamber 30.

Also in the embodiment of FIG. 7, the outlets 26, 98, 112 of the cathodic chamber 20, the second cathodic chamber 92, and the third cathodic chamber 108 are combined to a single unitary feed chamber 124 having an outlet 126. The single unitary feed chamber defined at least one aperture 128 for removing hydrogen gas and/or at least some of the catholyte solution. The outlet 126 of the single unitary feed chamber 124 is in fluid communication with the inlets 16, 88, 118 of the anodic chamber 12, the second anodic chamber 86, and the third anodic chamber 114, such that at least some of the catholyte solution is recycled and the first solution comprises the catholyte solution.

The embodiment of FIG. 7 may be modified, for example to recycle and/or recirculate at least some of the anolyte solution. Further still, the catholyte solution may be recycled in the cathodic chambers 20, 92, 108 rather than in the anodic chambers 12, 86, 114. FIG. 7 illustrates a multiple cell configuration of the system 10 including three cells. However, the system 10 may include any number of cells, e.g. eight cells, by further building upon the system 10 to further include additional anodic and cathodic chambers.

Figure 8:
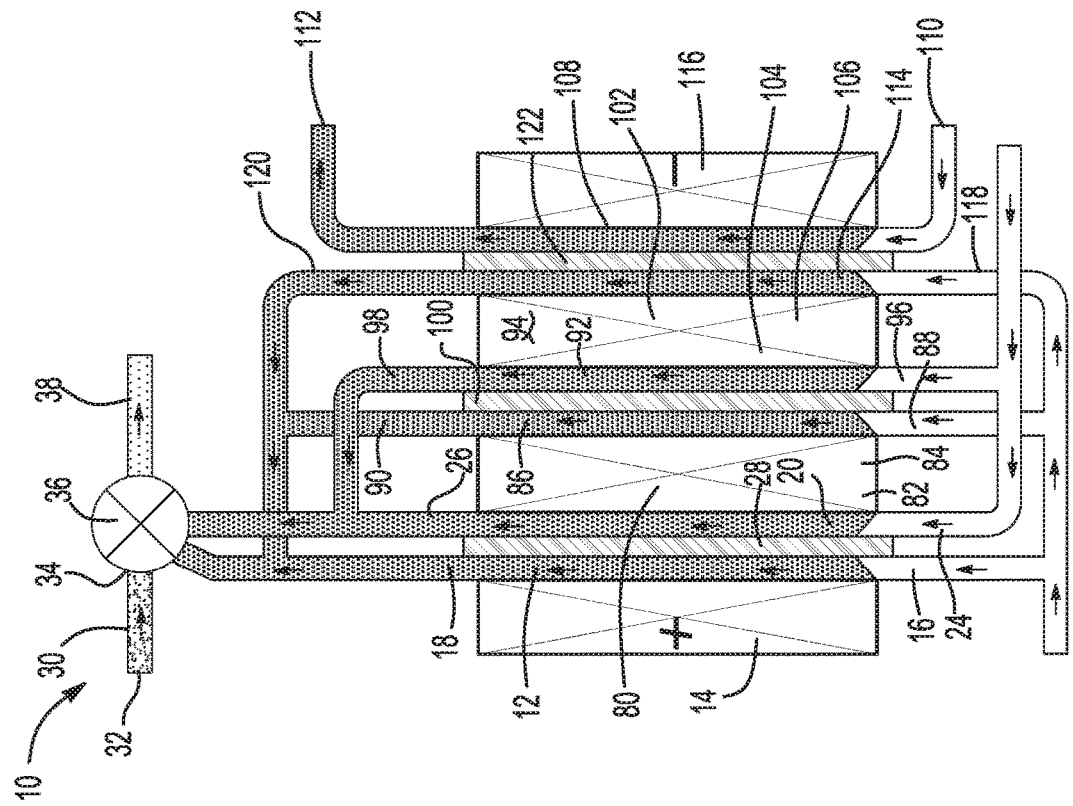
FIG. 8 is a schematic view of an eighth embodiment of the system also including a plurality of adjacent cells for generating a chlorine-containing compound according to the present invention.

FIG. 8 also illustrates a multiple cell configuration of the system 10. However, unlike the embodiment of FIG. 7, the embodiment of FIG. 8 does not utilize any recirculation or recycling of the anolyte solution and/or the catholyte solution. As such, the first solution in the embodiment of FIG. 8 does not comprise the catholyte solution. Certain features of the system 10, particularly optional features, are not shown in FIG. 8.

Rather than utilizing the catholyte solution from the outlets 26, 98, 112 of the cathodic chamber 20, the second cathodic chamber 92, and the third cathodic chamber 108 to feed the inlets 16, 88, 118 of the anodic chamber 12, the second anodic chamber 86, and the third anodic chamber 114, a fresh feed of the first solution is utilized. In particular, a single feed for providing the first solution is included which is split into the inlets 16, 88, 118 of the anodic chamber 12, the second anodic chamber 86, and the third anodic chamber 114. Similarly, a single feed for providing the second solution is included which is split into the inlets 24, 96, 110 of the cathodic chamber 20, the second cathodic chamber 92 and the third cathodic chamber 108.

In the embodiment of FIG. 8, at least some of the catholyte solution and at least some of the anolyte solution are fed to the mixing chamber 36. For example, the outlets 18, 90, 120 of the anodic chamber 12, the second anodic chamber 86, and the third anodic chamber 114 are combined into a single feed, which is in fluid communication with the mixing chamber 36. Alternatively, the outlets 18, 90, 120 of the anodic chamber 12, the second anodic chamber 86, and the third anodic chamber 114 may be in fluid communication with the mixing chamber 36 individually. The outlets 26, 98 of the cathodic chamber 20 and the second cathodic chamber 92 are combined into a single feed, which is in fluid communication with the mixing chamber 36. The outlet 112 of the third cathodic chamber 108 is not in fluid communication with the mixing chamber 36 such that at least some of the catholyte solution may optionally be recovered and utilized separate from the chlorine-containing mixture.

Figure 9:
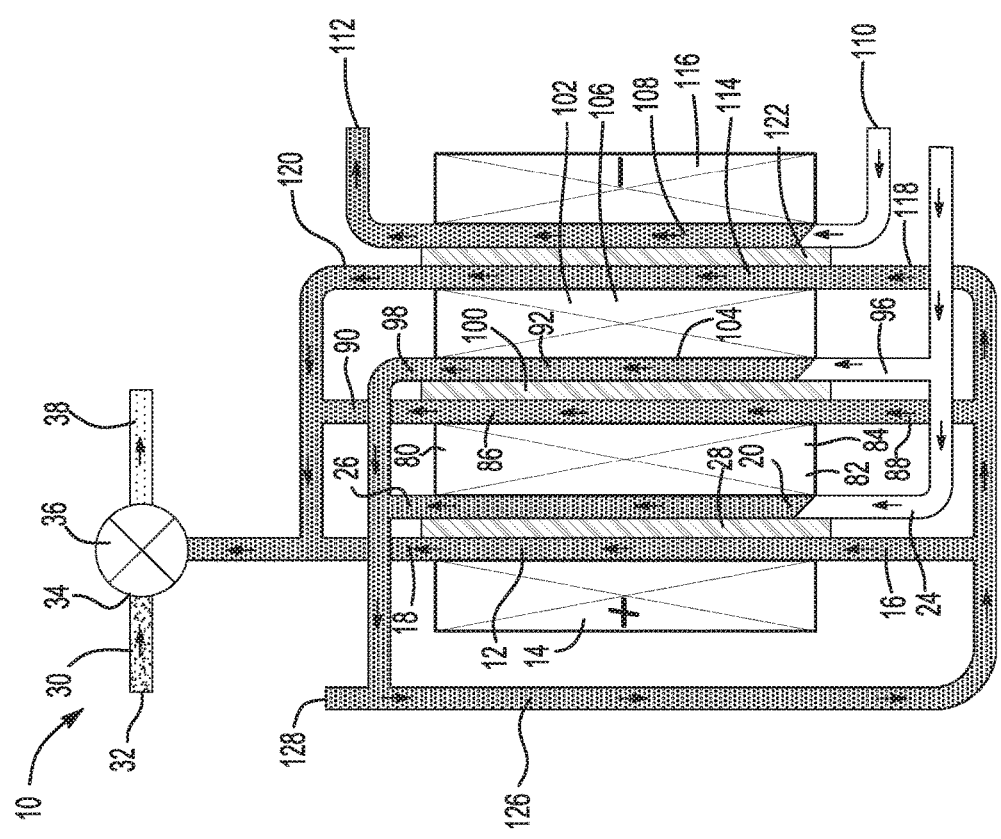
FIG. 9 is a schematic view of an ninth embodiment of the system also including a plurality of adjacent cells for generating a chlorine-containing compound according to the present invention.

FIG. 9 also illustrates a multiple cell configuration of the system 10. The embodiment of FIG. 9 utilizes partial recirculation or recycling of some of the catholyte solution such that the first solution fed to the inlets 16, 88, 118 of the anodic chamber 12, the second anodic chamber 86, and the third anodic chamber 114 comprises the catholyte solution.

Unlike the embodiment of FIG. 7, there is no single unitary feed chamber 124 formed by the outlets 26, 98, 112 of the cathodic chamber 20, the second cathodic chamber 92, and the third cathodic chamber 108. Instead, the outlets 26, 98 of the cathodic chamber 20 and the second cathodic chamber 92 are combined into a single feed, which is in fluid communication with the inlets 16, 88, 118 of the anodic chamber 12, the second anodic chamber 86, and the third anodic chamber 114. The outlet 112 of the third cathodic chamber 108 is not in fluid communication with the inlets 16, 88, 118 of the anodic chamber 12, the second anodic chamber 86, or the third anodic chamber 114. As such, at least some of the catholyte solution may be recovered, captured, or obtained from the outlet 112 of the third cathodic chamber 108.

Figure 10:
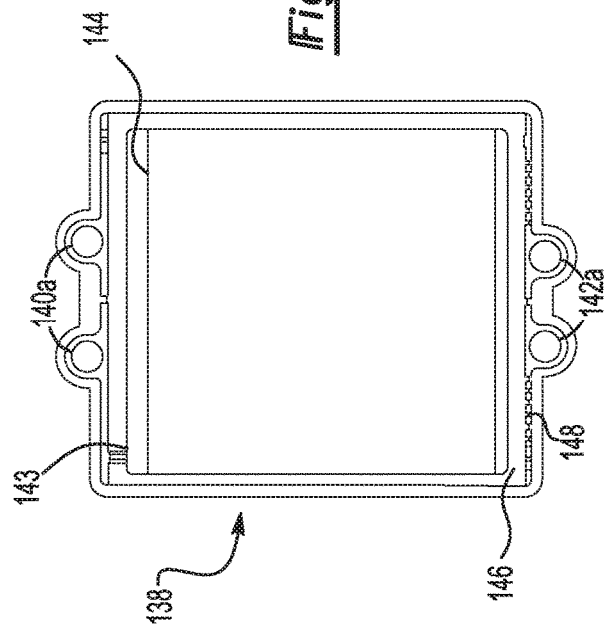
FIG. 10 is a top view of one embodiment of the system for generating a chlorine-containing compound according to the present invention.
Figure 11:
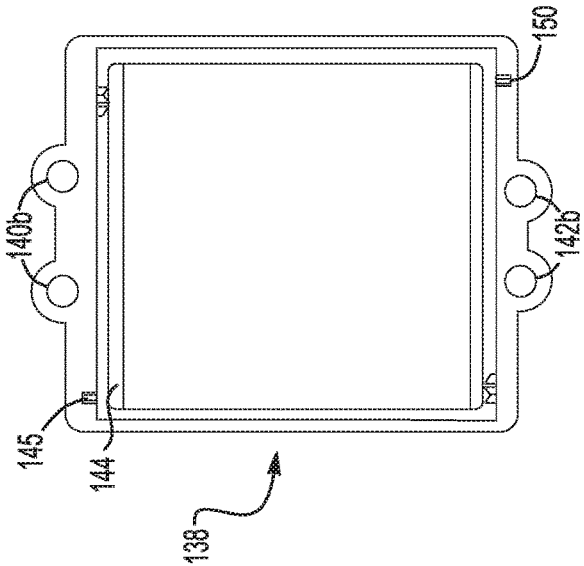
FIG. 11 is a bottom view of the system of FIG. 10.

FIG. 10 is a top view of one embodiment of the system 10, and FIG. 11 is a bottom view of the system 10 of FIG. 10. FIGS. 10 and 11 are representative of a single cell 138, which may be referred to as a single layer. The single layer is representative of one anodic chamber and/or one cathodic chamber, but two layers are required to give the system 10, which includes both anodic an cathodic chambers. The single cell 138 includes internal front outlets 140a and external rear outlets 140b. The single cell also includes internal front inlets 142a and external rear inlets 142b. Each of the internal front inlets 142a is hydraulically in parallel with one another and includes a flow restrictor 148 to balance fluid flow. A gas collection chamber 144 allows for the collection of gasses adjacent the electrodes to minimize any electrical resistance effect of the gasses adjacent the electrodes impacting current flow. The membrane 146 is adhered to the single cell 138. Because the membrane 146 is adhered to an exterior of the single cell 138, two cells 138 are combined to give the single cell configuration of the system 10, where the membrane 146 is between anodic and cathodic chambers (not shown), respectively. If two or more cells are desired, e.g. in the multiple cell configuration of the system 10, the number of single cells 138 utilized in the system 10 typically corresponds to formula x+1, where x is the number of cells desired. For example, a system 10 including eight cells comprises an array with nine single cells 139 stacked or adjacent one another.

The design of the single layer of FIGS. 10 and 11 allows for ease of manufacture of the system 10. For example, the internal front outlets 140a and external rear outlets 140b, along with the internal front inlets 142a and external rear inlets 142b, flow loops amongst or between various chambers of the system 10 are separated from the inlets and outlets of the system 10 through use of plugs (not shown) in an intermediate layer. As such, the single layer depicted in FIGS. 10 and 11 may be mass produced and assembled, with the layers alternating between cathodic and anodic chambers. The cathodic and anodic chambers and associated layers may be substantially identical to one another but for a difference in polarity between anodic and cathodic electrodes.

Figure 12:
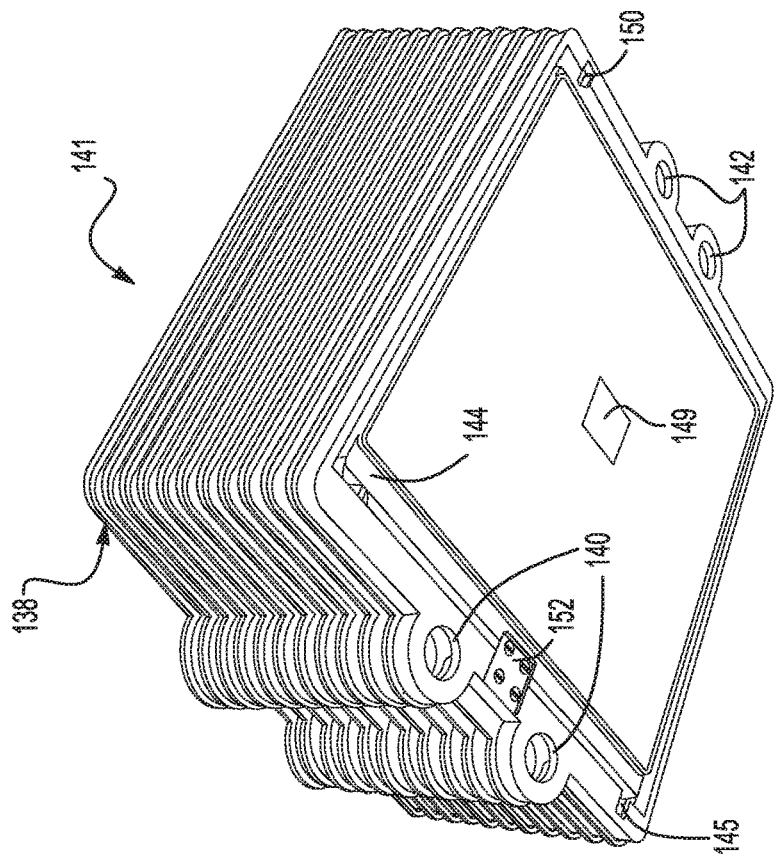
FIG. 12 is a perspective view of the system comprising an array including a plurality of cells for generating a chlorine-containing compound according to the present invention.

FIG. 12 is a perspective view of the system 10 comprising an array 141 including a plurality of cells 138. The array 141 includes a flow detector 150 to gas allow fluid communication over the membrane from a prior/adjacent layer or cell 138. An electrical contact 149 is included on an exterior of the array 141, which is for the application of the potential difference and current during use of the system 10. A circuit board 152 is included for controlling the various sensors and electrical components of the system 10.

In various embodiments, the mixing chamber 36 of the system 10 comprises a Venturi pump. The venture pump may be a single Venturi pump or may include more than one cascading Venturi pump. Venturi pumps may alternatively be referred to as aspirators and rely on the Venturi effect to produce a vacuum to drive fluid flow. Alternatively or in addition, the mixing chamber 36 of the system 10 may comprise an adsorption tower. Alternatively still, the mixing chamber 36 of the system 10 may be configured such that chlorine gas flows in a path counter to the flow of fluid in the mixing chamber 36. Yet alternatively, the mixing chamber 36 may comprise a cascade of two or more chambers containing chlorine gas. These latter alternatives may be utilized in conjunction with gravity and in the absence of any pressure devices or pumps.

The mixing chamber 36 of the system 10, independent of its type, may also include an ion exchange membrane for transferring anions and/or cations therebetween while limiting transfer of salt. This allows further recycling of fluid within the mixing chamber as anolyte solution or catholyte solution.

Figure 13:
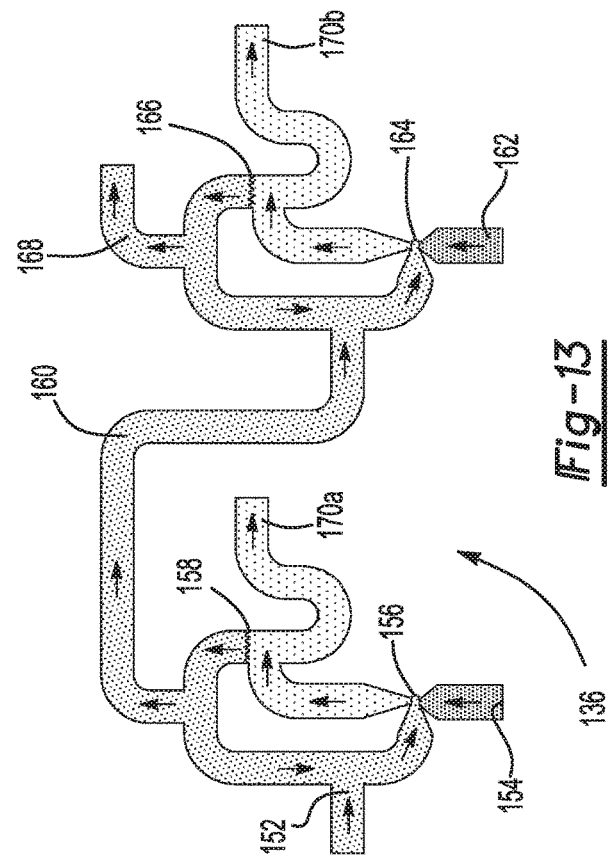
FIG. 13 is a schematic view of one portion of a mixing chamber in one embodiment of the system of the present invention.

FIG. 13 is a schematic view of a Venturi pump 136 suitable for use as or with the mixing chamber 36.

As shown in FIG. 13, the Venturi pump 136 may include a gas stream 152 which includes chlorine gas and optionally oxygen gas produced in the anolyte solution. The gas stream 152 may also include at least some of the anolyte solution. Alternatively, the gas stream 152 may be after separating the gas stream 152 from the anolyte solution via a trap (not shown) in the system, e.g. when the chlorine gas is fed to the mixing chamber 36 to be combined with the aqueous solution in the absence of the anolyte solution. A dilution stream 154 is combined with the gas stream 152 at a Venturi location 156 of the Venturi pump 136. Microscopic bubbles of chlorine gas are absorbed in the dilution stream 154 until velocity decreases and bubble size increases. A trap 158 may separate residual gasses from the combination of the dilution stream and chlorine gas. This residual gas may be vented or, as shown in FIG. 13, cascaded for further processing. Further, residual gas which is not cascaded for further processing may be recycled or recirculated and combined with the gas stream 152, as shown by the divergent arrows in FIG. 13 relative to the residual gas 160 and the gas stream 152. Recirculation or recycling of the gas stream 152 is particularly typical when the Venturi pump 136 includes but one Venturi location 156 (in contrast to the dual Venturi shown in FIG. 13). In FIG. 13, the residual gas 160 is fed to a second Venturi location 164 where it is combined with a second dilution stream 162. A trap 166 may separate further residual gasses from the combination of the dilution stream and chlorine gas, which may be vented or further cascaded (not shown). In FIG. 13, the chlorine-containing mixture can be recovered via either or both outputs 170a, 170b.

The dilution stream 154 and the second dilution stream 162 may be the same as or different from one another. The dilution stream 154 and the second dilution stream 162 are typically aqueous. For example, the dilution stream 154 and the second dilution stream 162 are typically the aqueous solution from the dilution chamber 30, in which case the Venturi pump 136 may serve as the mixing chamber 36 itself. Alternatively, the Venturi pump 136 may be a portion of, or upstream or downstream from, the mixing chamber 36. The dilution stream 154 and the second dilution stream 162 may comprise the anolyte solution. For example, the gas stream 152 may be separated from the anolyte solution via the trap (not shown), and recombined with the anolyte solution as the dilution stream 154 and/or the second dilution stream 162. When the gas stream 152 is separated from the anolyte solution via the trap and recombined with the anolyte solution, it is generally to achieve a different FAC value in the resulting chlorine-containing mixture, which is selectively controlled. Alternatively, the dilution stream 154 and the second dilution stream 162 may comprise water, as introduced above with respect to the aqueous solution.

The present invention additionally provides a method of generating the chlorine-containing mixture in the system 10. The method comprises disposing the first solution in the anodic chamber 12 and the second solution in the cathodic chamber 20. The method further comprises applying a potential difference between the anodic electrode 14 and the cathodic electrode 22 such that the anolyte solution is formed from the first solution and the catholyte solution is formed from the second solution. Upon application of the potential difference, chlorine gas is generated in the anodic chamber 12 along with the anolyte solution and at least the chlorine gas is combined with the aqueous solution in the mixing chamber 36. As introduced above, the FAC value of the chlorine-containing mixture may be selectively controlled via the system 10.

A potential difference is applied between the anodic and cathodic electrodes 14, 22 of the system 10, which results in the first solution forming the anolyte solution and the second solution forming the catholyte solution. Specifically, the first solution enters the inlet 16 of the anodic chamber 12, and the anolyte solution exits the outlet 18 of the anodic chamber 12. The second solution enters the inlet 24 of the cathodic chamber 20, and the catholyte solution exits the outlet 26 of the cathodic chamber 20.

In the cathodic chamber 20, hydrogen gas ($H_2$) is generally formed at the cathodic electrode 22 of the system 10. The hydrogen gas often drives flow of the second solution in the cathodic chamber 22 via convection. Generally, hydroxide compounds or ions are also formed along with the hydrogen gas in the cathodic chamber 22 of the system 10. The particular hydroxide compounds generated is contingent on the section of the chloride salt utilized in the first and/or second solutions. When the chloride salt is sodium chloride, sodium hydroxide and/or its ions are generated in the cathodic chamber 22 and present in the catholyte solution. One of skill in the art readily understands which hydroxide compounds or ions correspond with chloride salts.

In the anodic chamber 12, chlorine gas ($Cl_2$) is generally formed at the anodic electrode 14 of the system 10. Oxygen gas (O2) may also be generated along with the chlorine gas, although only chlorine gas is referenced below. The chlorine gas often drives flow of the first solution in the anodic chamber 12 via convection. In certain embodiments, depending on a selection of the first solution, chlorine-containing compounds or ions may also form along with the chlorine gas in the anodic chamber 12 of the system 10. For example, in certain embodiments described below, at least some of the catholyte solution may be recycled and utilized as the first solution. In these embodiments, the catholyte solution is routed directly or indirectly from the outlet 26 of the cathodic chamber 20 to the inlet 16 of the anodic chamber 12. As such, in these embodiments, the hydroxide compounds generated in the cathodic chamber 20 in the catholyte solution are present in the first solution when fed to the anodic chamber 12. In these embodiments, the anolyte solution generally also comprises as chlorine-containing compounds or ions various hypochlorite compounds and ions. For example, hypochlorite is an ion having the formula $^-OCl$. Hypochlorite may combine with various counterions from the chloride solution, e.g. sodium (Na), calcium (Ca), etc. to give various hypochlorites, e.g. sodium hypochlorite, calcium hypochlorite, hypochlorous acid, etc. The particular chlorine-containing compounds or ions generated are contingent on the section of the chloride salt utilized in the first and/or second solutions.

Specifically, as the hydrogen gas is generated in the cathodic chamber 22 of the system 10, fluid flows through the cathodic chamber 22 to the outlet 26 thereof, for recovery/disposal, recycling, and/or combination with the aqueous solution in the mixing chamber 36. Similarly, as the chlorine gas is generated in the anodic chamber 12 of the system 10, fluid flows through the anodic chamber 12 to the outlet 18 thereof, for recovery/disposal, recycling, and/or combination with the aqueous solution in the mixing chamber 36. In certain embodiments, the configuration of the system 10 allows for convection to drive fluid flow throughout the system 10 such that the system 10 is free from components generally utilized in conventional systems, such as metering pumps, which add complexity and cost to such conventional systems. To this end, in certain embodiments, the system 10 is free from any external fluid regulators and metering pumps to induce fluid flow such that the system 10 is free from moving parts or components during use of the system 10 and fluid flow is driven via convection. "External" means any component or device that may be utilized to induce fluid flow other than flow control regulators, or flow restrictors, as described below, which are generally integral with the system 10 and which merely restrict fluid flow at certain locations within the system 10 to further drive overall fluid flow. Any power supply or components utilized to apply or modify the potential difference, e.g. any circuit boards or microprocessors, are also outside the scope of "external" as it relates to fluid regulators for inducing fluid flow. For example, the system 10 may include electronic controls (not shown), which may be analog and/or digital, to control and monitor aspects of the system 10, including potential difference, current, etc.

As readily understood by one of skill in the art, applying the potential difference between the anodic and cathodic electrodes 14, 22 of the system 10 is commonly referred to as electrolysis. The potential difference applied between the anodic and cathodic electrodes 14, 22 of the system 10 may vary with respect to the anodic and cathodic electrodes 14, 22 utilized. In the embodiments in which the anodic and cathodic electrodes 14, 22 of the system 10 comprise graphite, the potential difference applied between the anodic and cathodic electrodes 14, 22 is typically from 1 to 30, alternatively from 2 to 15, alternatively from 3 to 6, volts. The associated current between the anodic and cathodic electrodes 14, 22 of the system 10 is from 0.0001 to 5, alternatively from 0.01 to 1, alternatively from 0.1 to 0.5, amps/cm.

As noted above, the gasses generated in the system 10 typically drive fluid flow via convection. However, in other embodiments, particularly where the anolyte solution and/or the catholyte solution is recirculated or recycled, the system 10 may further comprise a fluid regulator for precisely and selectively controlling flow. The fluid regulator may be any fluid regulator known to those of skill in the art. For example, the fluid regulator may comprise at least one of a flow control regulator, a pressure regulator, and a metering pump. When the fluid regulator is the flow control regulator, the inlet 16 of the anodic chamber 12 and the inlet 24 of the cathodic chamber 22 may each independently include such a flow control regulator, or flow restrictors, as readily understood in the art. Typically, such flow control regulators or flow restrictors are formed contemporaneously with the anodic chamber 12 and/or the cathodic chamber 20. These flow control regulators or flow restrictors typically reduce an inner diameter of the inlet 16 of the anodic chamber 12 and the inlet 24 of the cathodic chamber 22 via protruded polymeric material. The system 10 may also include at least one metering pump and/or at least one pressure regulator for controlling or influencing fluid flow.

When the system 10 includes the dual cell or multiple cell configuration, the system 10 may include more than one power supply for applying the potential difference across various sets of electrodes depending on a number of anodic and cathodic chambers utilized.

Generally, the FAC value of the chlorine-containing mixture may be selectively controlled independent of a concentration of the first and/or second solutions. For example, many factors impact the FAC value, including the relative flow of the first and second solutions, and that of the anolyte and catholyte solutions, whether the anolyte and/or catholyte solutions are recirculated or recycled, the potential difference applied, the current utilized, the volume of aqueous solution provided via the dilution chamber 30, etc. These variables may be modified to give the desired FAC value of the chlorine-containing mixture. The chlorine-containing mixture is recovered from the outlet 38 of the mixing chamber 36. However, depending on an end use application or geography of the system 10, the anolyte solution and/or the catholyte solution, is not present in the chlorine-containing mixture, may have additional value or uses, and may be desired to the exclusion of the chlorine-containing mixture.

In certain embodiments, the chlorine-containing mixture has an FAC value of greater than 500 parts per million (ppm). For example, FAC values of 150,000 ppm may be achieved. In these or other embodiments, the system is configured such that the (FAC) value of the anolyte solution is at least 2,000 ppm and wherein the catholyte solution comprises hydroxide in an amount of at least 0.2 weight percent based on the total weight of the catholyte solution. In specific embodiments, the FAC value of the chlorine-containing mixture is from 1 to 150,000, alternatively from 10 to 10,000, alternatively from 25 to 5,000 ppm. In these or other embodiments, the catholyte solution comprises sodium hydroxide in an amount of from 0.0001 to 10, alternatively from 0.01 to 5, alternatively from 0.1 to 1, weight percent based on the total weight of the catholyte solution.

The system is typically free from any pH probes, as pH may be selectively manipulated by altering the configuration of the system 10.

Over time after use of the system 10, the anodic and cathodic electrodes 14, 22 as well as the membrane 28 may require cleaning, e.g. from building up of ions which can impact efficiency of the system. In certain embodiments, the system 10 is configured to reverse polarity of the cathodic electrode 22 and the anodic electrode 14 in response to a predetermined event for maintaining and cleaning the cathodic and anodic electrodes 14, 22 and the membrane 28. The predetermined event may be a predetermined time, a predetermined volume flow or production, etc. Further still, as introduced above, the anodic and cathodic electrodes 14, 22 as well as the membrane 28 may together comprise the single cartridge, which may be disengaged from the system 10 and replaced with a new single cartridge. This allows for perpetual use of the system 10 at significantly reduced cost as compared to conventional systems. The system is typically advantageous configured to operate at an operating temperature that is less than 40° C. The single cartridge may have an electronic storage device for logging or otherwise storing performance or operational information, e.g. run time, for determining when replacement with a new single cartridge is desired prior to failure (or other predetermined event). The system 10 may also include a display in any location that is in communication with the electronic storage device for alerting or providing a user or operator with relevant information.

Dimensions of the system 10 may vary. For example, the system 10 may be configured to be portable. Alternatively, the system 10 may be large enough to be immobile. Output and volume of the chlorine-containing mixture may vary. The chlorine-containing mixture has an indefinite shelf life when properly stored and sealed.

The system 10 may further be configured to utilize software to control the system 10 and the various electrical components thereof, including the potential difference and current applied. For example, the software may monitor via the fill sensor 40 when the anodic and cathodic chambers 12, 20 have received the first and second solutions, respectively, at which point the potential difference is applied between the anodic and cathodic electrodes 14, 22. The current and/or potential difference may be modified, e.g. increased, to selectively generate chlorine gas when desired.

The system 10 and resulting chlorine-containing mixture have numerous end use applications. For example, the chlorine-containing mixture may be utilized to disinfect a substrate, e.g. on a human or in a hospital or kitchen. Alternatively, the chlorine-containing mixture may be utilized to disinfect fracking wells.

In some embodiments the invention comprises any one of the following numbered aspects:

[Aspect 1] A system for generating a chlorine-containing mixture, the system comprising: an anodic chamber comprising an anodic electrode and having an inlet for a first solution and an outlet for an anolyte solution; a cathodic chamber spaced from and adjacent the anodic chamber, the cathodic chamber comprising a cathodic electrode and having an inlet for a second solution and an outlet for a catholyte solution, the second solution being the same as or different from the first solution and at least one of the first and second solutions comprising a chlorinated solution; a membrane disposed between and separating the anodic chamber and the cathodic chamber; a dilution chamber having an inlet for an aqueous solution and an outlet; and a mixing chamber, the mixing chamber having an outlet for the chlorine-containing mixture, with the outlet of the dilution chamber being in fluid communication with the mixing chamber; wherein chlorine gas is generated in the anodic chamber along with the anolyte solution and wherein at least the chlorine gas is combined with the aqueous solution in the mixing chamber, and wherein a free available chlorine (FAC) value of the chlorine-containing mixture may be selectively controlled via the system.

[Aspect 2] The system of Aspect 1 wherein the anodic chamber, the cathodic chamber, and the membrane together form a single cartridge which is configured to be engageable and disengageable from the system such that the single cartridge may be replaced within the system.

[Aspect 3] The system of Aspect 1 or 2 wherein the anodic electrode and the cathodic electrode each comprises graphite.

[Aspect 4] The system of any one of Aspects 1-3 wherein the mixing chamber is in fluid communication with the outlet of the anodic chamber such that at least some of the anolyte solution is present in the chlorine-containing mixture.

[Aspect 5] The system of any one of Aspects 1-4 wherein the FAC value of the chlorine-containing mixture may be selectively controlled independent of a concentration of the first and/or second solutions.

[Aspect 6] The system of any one of Aspects 1-5 further comprising a fill sensor for detecting a presence of the first and second solutions in the anodic and cathodic chambers, respectively, and wherein the system is configured to apply a potential difference between the anodic electrode and the cathodic electrode when the fill sensor detects the presence of the first and second chlorine solutions in the anodic and cathodic chambers, respectively.

[Aspect 7] The system of any one of Aspects 1-6 wherein the cathodic chamber defines at least one aperture for removing hydrogen gas and/or at least some of the catholyte solution, and wherein the outlet of the cathodic chamber is in fluid communication with the mixing chamber such that at least some of the catholyte solution is combined in the mixing chamber with at least the chlorine gas and the aqueous solution to give the chlorine-containing mixture.

[Aspect 8] The system of any one of Aspects 1-7 wherein the anodic chamber defines a flow detector such that the system is configured to selectively inhibit generation of chlorine gas in the anodic chamber.

[Aspect 9] The system of any one of Aspects 1-8 wherein the outlet of the cathodic chamber is in fluid communication with the inlet of the anodic chamber such that at least some of the catholyte solution is recycled and the first solution comprises the catholyte solution.

[Aspect 10] The system of any one of Aspects 1-9 wherein the cathodic chamber defines at least one aperture for removing hydrogen gas and/or at least some of the catholyte solution, wherein the outlet of the cathodic chamber is in fluid communication with the inlet of the cathodic chamber such that at least some of the catholyte solution is recycled and the second solution comprises the catholyte solution.

[Aspect 11] The system of Aspect 10 wherein the outlet of the anodic chamber is bifurcated into first and second outlets, wherein the first outlet is in fluid communication with the mixing chamber and wherein the second outlet is in fluid communication with the inlet of the anodic chamber such that at least some of the anolyte solution is fed to the mixing chamber and at least some of the anolyte solution is recycled such that the second solution comprises the anolyte solution.

[Aspect 12] The system of any one of Aspects 1-10 further comprising a salt tank having an inlet and an outlet, wherein the outlet of the anodic chamber is bifurcated into first and second outlets, wherein the first outlet is in fluid communication with the mixing chamber and wherein the second outlet is in fluid communication with the inlet of the salt tank such that at least some of the anolyte solution is fed to the mixing chamber and at least some of the anolyte solution is fed to the salt tank, and wherein the outlet of the salt tank is in fluid communication with the inlet of the anodic chamber for providing the first solution.

[Aspect 13] The system of Aspect 12 further comprising a heat exchanger coupled to the inlet of the dilution chamber and the inlet of the salt tank to increase a temperature of the anolyte solution to separate any chlorine gas from the anolyte solution prior to entering the brine tank.

[Aspect 14] The system of any one of Aspects 1-13 further comprising: an initial anodic chamber comprising an initial anodic electrode and having an inlet and an outlet; an initial cathodic chamber spaced from and adjacent the initial anodic chamber, the initial cathodic chamber comprising an initial cathodic electrode and having an inlet and an outlet; and an initial membrane disposed between and separating the initial anodic chamber and the initial cathodic chamber; wherein the outlet of the initial anodic chamber is in fluid communication with the inlet of the anodic chamber; wherein the inlet of the initial cathodic chamber is bifurcated into first and second inlets, with the first inlet being in fluid communication with the initial cathodic chamber and the second inlet bypassing the initial cathodic chamber and being in fluid communication with the inlet of the cathodic chamber.

[Aspect 15] The system of Aspect 14 wherein the outlet of the cathodic chamber is in fluid communication with the inlet of the anodic chamber such that the catholyte solution from the cathodic chamber is fed to the inlet of the initial anodic chamber.

[Aspect 16] The system of any one of Aspects 1-13 wherein the cathodic electrode of the cathodic chamber is further defined as a bipolar electrode having a cathodic portion and an anodic portion opposite the cathodic potion, the system further comprising: a second anodic chamber comprising the anodic portion of the bipolar electrode and having an inlet and an outlet; a second cathodic chamber spaced from and adjacent the second anodic chamber, the second cathodic chamber comprising a second cathodic electrode and having an inlet an outlet; and a second membrane disposed between and separating the second anodic chamber and the second cathodic chamber; wherein the second solution is fed to the inlet of the cathodic chamber and the inlet of the second cathodic chamber; and wherein the outlet of the anodic chamber and the outlet of the second anodic chamber are in fluid communication with the mixing chamber.

[Aspect 17] The system of Aspect 16 wherein the second cathodic electrode of the second cathodic chamber is further defined as a second bipolar electrode having a cathodic portion and an anodic portion opposite the cathodic potion, the system further comprising: a third anodic chamber comprising the anodic portion of the second bipolar electrode and having an inlet and an outlet; a third cathodic chamber spaced from and adjacent the third anodic chamber, the third cathodic chamber comprising a third cathodic electrode and having an inlet an outlet; and a third membrane disposed between and separating the third anodic chamber and the third cathodic chamber; wherein the second solution is also fed to the inlet of the third cathodic chamber; and wherein the outlet of the third anodic chamber is in fluid communication with the mixing chamber.

[Aspect 18] The system of Aspect 17 wherein the outlet of the cathodic chamber, the outlet of the second cathodic chamber, and the outlet of the third cathodic chamber are combined to a single unitary feed chamber having an outlet, wherein the single unitary feed chamber defines at least one aperture for removing hydrogen gas and/or at least some of the catholyte solution, and wherein the outlet of the single unitary feed chamber is in fluid communication with the inlet of the anodic chamber, the inlet of the second anodic chamber, and the inlet of the third anodic chamber, such that at least some of the catholyte solution is recycled and the first solution comprises the catholyte solution.

[Aspect 19] The system of any one of Aspects 1-18 wherein the chlorine-containing mixture has an FAC value of greater than 500 parts per million (ppm).

[Aspect 20] The system of any one of Aspects 1-19 wherein the chlorinated solution comprises at least 4 wt. % of a chloride salt based on the total weight of the chlorinated solution prior to any ion separation of the chloride salt in the chlorinated solution.

[Aspect 21] The system of Aspect 20 configured such that (FAC) value of the anolyte solution is at least 2,000 ppm and wherein the catholyte solution comprises hydroxide in an amount of at least 0.2 weight percent based on the total weight of the catholyte solution.

[Aspect 22] The system of any one of Aspects 1-21 wherein the membrane comprises a porous dielectric material.

[Aspect 23] The system of any one of Aspects 1-22 free from any pH probes.

[Aspect 24] The system of any one of Aspects 1-23 configured to reverse polarity of the cathodic electrode and the anodic electrode in response to a predetermined event for maintaining and cleaning the cathodic and anodic electrodes and the membrane.

[Aspect 25] The system of any one of Aspects 1-24 configured to operate at an operating temperature that is less than 40° C.

[Aspect 26] The system of any one of Aspects 1-25 wherein the mixing chamber is comprises a Venturi pump.

[Aspect 27] The system of any one of Aspects 1-26 wherein at least the first solution comprises the chlorinated solution.

[Aspect 28] The system of any one of Aspects 1-27 further comprising a first restrictor in the anodic chamber and a second restrictor in the cathodic chamber to substantially maintain flow of the first and second solutions, respectively.

[Aspect 29] The system of any one of Aspects 1-28 further comprising a trap in the outlet of the anodic chamber for separating the chlorine gas from the anolyte solution prior to the mixing chamber.

[Aspect 30] The system of Aspect 1, wherein the outlet of the cathodic chamber is in fluid communication with the mixing chamber such that at least some of the catholyte solution is combined in the mixing chamber, wherein the outlet of the anodic chamber is in fluid communication with the mixing chamber such that at least some of the anolyte solution is combined in the mixing chamber, and wherein the mixing chamber comprises a Venturi pump.

[Aspect 31] A method of generating a chlorine-containing mixture in a system, which comprises an anodic chamber comprising an anodic electrode and having an inlet for a first solution and an outlet for an anolyte solution; a cathodic chamber spaced from and adjacent the anodic chamber, the cathodic chamber comprising a cathodic electrode and having an inlet for a second solution and an outlet for a catholyte solution, the second solution being the same as or different from the first solution and at least one of the first and second solutions comprising a chlorinated solution; a membrane disposed between and separating the anodic chamber and the cathodic chamber; a dilution chamber having an inlet for an aqueous solution and an outlet; and a mixing chamber, the mixing chamber being in fluid communication with the outlet of the dilution chamber and having an outlet for the chlorine-containing mixture; the method comprises the steps of: disposing the first solution in the anodic chamber and the second solution in the cathodic chamber; applying a potential difference between the anodic electrode and the cathodic electrode such that the anolyte solution is formed from the first solution and the catholyte solution is formed from the second solution; wherein chlorine gas is generated in the anodic chamber along with the anolyte solution and wherein at least the chlorine gas is combined with the aqueous solution in the mixing chamber, and wherein a free available chlorine value of the chlorine-containing mixture may be selectively controlled via the system.

[Aspect 32] The method of Aspect 31 wherein the system further comprises a sensor for detecting a presence of the first and second solutions in the anodic and cathodic chambers, respectively, and wherein the method further comprises sensing the presence of the first and second solutions in the anodic and cathodic chambers, respectively, prior to applying the potential difference.

[Aspect 33] The method of Aspect 31 or 32 wherein the anodic chamber, the cathodic chamber, and the membrane together form a single cartridge which is configured to be engageable and disengageable from the system such that the single cartridge may be replaced within the system.

[Aspect 34] The method of any one of Aspects 31-33 wherein the anodic electrode and the cathodic electrode each comprises graphite.

[Aspect 35] The method of any one of Aspects 31-34 wherein the mixing chamber is in fluid communication with the outlet of the anodic chamber such that at least some of the anolyte solution is present in the chlorine-containing mixture.

[Aspect 36] The method of any one of Aspects 31-35 wherein the FAC value of the chlorine-containing mixture may be selectively controlled independent of a concentration of the first and/or second solutions.

[Aspect 37] The method of any one of Aspects 31-36 wherein the cathodic chamber defines at least one aperture for removing hydrogen gas and/or at least some of the catholyte solution, and wherein the outlet of the cathodic chamber is in fluid communication with the mixing chamber such that at least some of the catholyte solution is combined in the mixing chamber with at least the chlorine gas and the aqueous solution to give the chlorine-containing mixture.

[Aspect 38] The method of any one of Aspects 31-37 wherein the anodic chamber defines a flow detector and wherein the method further comprises selectively inhibiting generation of chlorine gas in the anodic chamber.

[Aspect 39] The method of any one of Aspects 31-36 and 38 wherein the cathodic chamber defines at least one aperture for removing hydrogen gas and/or at least some of the catholyte solution, and wherein the outlet of the cathodic chamber is in fluid communication with the inlet of the anodic chamber such that such that the method further comprises recycling at least some of the catholyte solution and the first solution comprises the catholyte solution.

[Aspect 40] The method of any one of Aspects 31-36 and 38 wherein the cathodic chamber defines at least one aperture for removing hydrogen gas and/or at least some of the catholyte solution, wherein the outlet of the cathodic chamber is in fluid communication with the inlet of the cathodic chamber such that the method further comprises recycling at least some of the catholyte solution and the second solution comprises the catholyte solution.

[Aspect 41] The method of Aspect 40 wherein the outlet of the anodic chamber is bifurcated into first and second outlets, wherein the first outlet is in fluid communication with the mixing chamber and wherein the second outlet is in fluid communication with the inlet of the anodic chamber such that at least some of the anolyte solution is fed to the mixing chamber and at least some of the anolyte solution is recycled such that the second solution comprises the anolyte solution.

[Aspect 42] The method of any one of Aspects 31-36 and 38 wherein the system further comprises a salt tank having an inlet and an outlet, wherein the outlet of the anodic chamber is bifurcated into first and second outlets, wherein the first outlet is in fluid communication with the mixing chamber and wherein the second outlet is in fluid communication with the inlet of the salt tank such that at least some of the anolyte solution is fed to the mixing chamber and at least some of the anolyte solution is fed to the salt tank, and wherein the outlet of the salt tank is in fluid communication with the inlet of the anodic chamber for providing the first solution.

[Aspect 43] The method of Aspect 42 further comprising a heat exchanger coupled to the inlet of the dilution chamber and the inlet of the salt tank and the method further comprises increasing a temperature of the anolyte solution to separate any chlorine gas from the anolyte solution prior to entering the brine tank.

[Aspect 44] The method of any one of Aspects 31-43 wherein the system further comprises: an initial anodic chamber comprising an initial anodic electrode and having an inlet and an outlet; an initial cathodic chamber spaced from and adjacent the initial anodic chamber, the initial cathodic chamber comprising an initial cathodic electrode and having an inlet and an outlet; and an initial membrane disposed between and separating the initial anodic chamber and the initial cathodic chamber; wherein the outlet of the initial anodic chamber is in fluid communication with the inlet of the anodic chamber; wherein the inlet of the initial cathodic chamber is bifurcated into first and second inlets, with the first inlet being in fluid communication with the initial cathodic chamber and the second inlet bypassing the initial cathodic chamber and being in fluid communication with the inlet of the cathodic chamber.

[Aspect 45] The method of Aspect 44 wherein the outlet of the cathodic chamber is in fluid communication with the inlet of the anodic chamber such that the catholyte solution from the cathodic chamber is fed to the inlet of the initial anodic chamber.

[Aspect 46] The method of any one of Aspects 31-45 wherein the cathodic electrode of the cathodic chamber is further defined as a bipolar electrode having a cathodic portion and an anodic portion opposite the cathodic potion, the system further comprising: a second anodic chamber comprising the anodic portion of the bipolar electrode and having an inlet and an outlet; a second cathodic chamber spaced from and adjacent the second anodic chamber, the second cathodic chamber comprising a second cathodic electrode and having an inlet an outlet; and a second membrane disposed between and separating the second anodic chamber and the second cathodic chamber; wherein the first solution is fed to the inlet of the anodic chamber and the inlet of the second anodic chamber; and wherein the outlet of the second anodic chamber is in fluid communication with the mixing chamber.

[Aspect 47] The method of Aspect 46 wherein the second cathodic electrode of the second cathodic chamber is further defined as a second bipolar electrode having a cathodic portion and an anodic portion opposite the cathodic potion, the system further comprising: a third anodic chamber comprising the anodic portion of the second bipolar electrode and having an inlet and an outlet; a third cathodic chamber spaced from and adjacent the third anodic chamber, the third cathodic chamber comprising a third cathodic electrode and having an inlet an outlet; and a third membrane disposed between and separating the third anodic chamber and the third cathodic chamber; wherein the first solution is also fed to the inlet of the third anodic chamber; and wherein the outlet of the third anodic chamber is in fluid communication with the mixing chamber.

[Aspect 48] The method of Aspect 47 wherein the outlet of the cathodic chamber, the outlet of the second cathodic chamber, and the outlet of the third cathodic chamber are combined to a single unitary feed chamber having an outlet, wherein the single unitary feed chamber defines at least one aperture for removing hydrogen gas and/or at least some of the catholyte solution, and wherein the outlet of the single unitary feed chamber is in fluid communication with the inlet of the anodic chamber, the inlet of the second anodic chamber, and the inlet of the third anodic chamber, such that at least some of the catholyte solution is recycled and the first solution comprises the catholyte solution.

[Aspect 49] The method of any one of Aspects 31-48 wherein the chlorine-containing mixture has an FAC value of greater than 500 parts per million (ppm).

[Aspect 50] The method of any of Aspects 31-49 wherein the chlorinated solution comprises at least 4 wt. % of a chloride salt based on the total weight of the chlorinated solution prior to any ion separation of the chloride salt in the chlorinated solution.

[Aspect 51] The method of Aspect 50 configured such that the (FAC) value of the anolyte solution is at least 2,000 ppm and wherein the catholyte solution comprises hydroxide in an amount of at least 0.2 weight percent based on the total weight of the catholyte solution.

[Aspect 52] The method of any one of Aspects 31-51 wherein the membrane of the system comprises a porous dielectric material.

[Aspect 53] The method of any one of Aspects 31-52 wherein the system is free from any pH probes.

[Aspect 54] The method of any one of Aspects 31-53 wherein the system is configured to reverse polarity of the cathodic electrode and the anodic electrode in response to a predetermined event, and wherein the method further comprises reversing polarity of the cathodic electrode and the anodic electrode in response to the predetermined event.

[Aspect 55] The method of any one of Aspects 31-54 carried out at an operating temperature of the system that is less than 40° C.

[Aspect 56] The method of any one of Aspects 31-55 wherein the mixing chamber comprises a Venturi pump.

[Aspect 57] The method of any one of Aspects 31-56 wherein at least the first solution comprises the chlorinated solution.

[Aspect 58] The method of any one of Aspects 31-57 wherein the system further comprises a first restrictor in the anodic chamber and a second restrictor in the cathodic chamber to substantially maintain flow of the first and second solutions, respectively.

[Aspect 59] The method of any of Aspects 31-58 wherein each of the cathodic and anodic electrodes comprises carbon and wherein the method further comprises electrochemically activating the cathodic and anodic electrodes to increase surface area of the cathodic and anodic electrodes.

[Aspect 60] The method of any one of Aspects 31-59 wherein the system further comprises a trap in the outlet of the anodic chamber for separating the chlorine gas from the anolyte solution prior to the mixing chamber.

[Aspect 61] The method of Aspect 31 wherein the outlet of the cathodic chamber is in fluid communication with the mixing chamber such that at least some of the catholyte solution is combined in the mixing chamber, wherein the outlet of the anodic chamber is in fluid communication with the mixing chamber such that at least some of the anolyte solution is combined in the mixing chamber, and wherein the mixing chamber comprises a Venturi pump.

[Aspect 62] A system for generating a chlorine-containing mixture, the system comprising: an anodic chamber comprising an anodic electrode and having an inlet for a first solution and an outlet for an anolyte solution; a cathodic chamber spaced from and adjacent the anodic chamber, the cathodic chamber comprising a cathodic electrode and having an inlet for a second solution and an outlet for a catholyte solution, the second solution being the same as or different from the first solution and at least one of the first and second solutions comprising a chlorinated solution; a membrane disposed between and separating the anodic chamber and the cathodic chamber; wherein each of the anodic electrode and the cathodic electrode comprises carbon; wherein the membrane comprises a porous dielectric material; wherein the anodic chamber, the cathodic chamber, and the membrane together form a single cartridge which is configured to be engageable and disengageable from the system such that the single cartridge may be replaced within the system; wherein the chlorine-containing mixture is generated and present along with the anolyte solution and/or the catholyte solution.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A system for generating a chlorine-containing mixture, said system comprising:
    an anodic chamber comprising an anodic electrode and having an inlet for a first solution and an outlet for an anolyte solution, said outlet is bifurcated into a first outlet and a second outlet, said second outlet being in fluid communication with said inlet of said anodic chamber;
    a cathodic chamber spaced from and adjacent said anodic chamber, said cathodic chamber comprising a cathodic electrode and having an inlet for a second solution and an outlet for a catholyte solution, the second solution being the same as or different from the first solution and at least one of the first and second solutions comprising a chlorinated solution including chlorine-containing compounds;
    a membrane disposed between and separating said anodic chamber and said cathodic chamber;
    a dilution chamber having an inlet for an aqueous solution and an outlet;
    a mixing chamber, said mixing chamber having an outlet for the chlorine-containing mixture, with said outlet of said dilution chamber being in fluid communication with said mixing chamber, said first outlet of said anodic chamber being in fluid communication with said mixing chamber, and with said mixing chamber comprising a Venturi pump; and
    a heat exchanger between said dilution chamber and said second outlet of said anodic chamber;
    wherein chlorine gas is generated in said anodic chamber along with the anolyte solution and wherein at least the chlorine gas is combined with the aqueous solution in said mixing chamber, and wherein a free available chlorine (FAC) value of the chlorine-containing mixture is selectively controlled via said system;
    wherein said outlet of said cathodic chamber is in fluid communication with said mixing chamber such that at least some of the catholyte solution is combined in said mixing chamber, and wherein said outlet of said anodic chamber is in fluid communication with said mixing chamber such that at least some of the anolyte solution is combined in said mixing chamber;
    wherein said cathodic chamber defines at least one aperture for removing hydrogen gas and/or at least some of the catholyte solution, wherein said outlet of said cathodic chamber is in fluid communication with said inlet of said cathodic chamber such that at least some of the catholyte solution is recycled and the second solution comprises the catholyte solution; and
    wherein said outlet of said anodic chamber is bifurcated into first and second outlets, wherein said first outlet is in fluid communication with said mixing chamber and wherein said second outlet is in fluid communication with said inlet of said anodic chamber such that at least some of the anolyte solution is fed to said mixing chamber and at least some of the anolyte solution is recycled such that the first solution comprises the anolyte solution.

2. The system of claim 1 wherein said anodic chamber, said cathodic chamber, and said membrane together form a single cartridge which is configured to be engageable and disengageable from said system such that said single cartridge may be replaced within said system.

3. The system of claim 1 further comprising:
    an initial anodic chamber comprising an initial anodic electrode and having an inlet and an outlet;
    an initial cathodic chamber spaced from and adjacent said initial anodic chamber, said initial cathodic chamber comprising an initial cathodic electrode and having an inlet and an outlet; and
    an initial membrane disposed between and separating said initial anodic chamber and said initial cathodic chamber;
    wherein said outlet of said initial anodic chamber is in fluid communication with said inlet of said anodic chamber;
    wherein said inlet of said initial cathodic chamber is bifurcated into first and second inlets, with said first inlet being in fluid communication with said initial cathodic chamber and said second inlet bypassing said initial cathodic chamber and being in fluid communication with said inlet of said cathodic chamber.

4. The system of claim 3 wherein said outlet of said cathodic chamber is in fluid communication with said inlet of said anodic chamber such that the catholyte solution from said cathodic chamber is fed to said inlet of said initial anodic chamber.

5. The system of claim 1 wherein said cathodic electrode of said cathodic chamber is further defined as a bipolar electrode having a cathodic portion and an anodic portion opposite said cathodic potion, said system further comprising:
- a second anodic chamber comprising said anodic portion of said bipolar electrode and having an inlet and an outlet;
- a second cathodic chamber spaced from and adjacent said second anodic chamber, said second cathodic chamber comprising a second cathodic electrode and having an inlet an outlet; and
- a second membrane disposed between and separating said second anodic chamber and said second cathodic chamber;
- wherein the second solution is fed to said inlet of said cathodic chamber and said inlet of said second cathodic chamber; and
- wherein said outlet of said anodic chamber and said outlet of said second anodic chamber are in fluid communication with said mixing chamber.

6. The system of claim 5 wherein said second cathodic electrode of said second cathodic chamber is further defined as a second bipolar electrode having a cathodic portion and an anodic portion opposite said cathodic potion, said system further comprising:
- a third anodic chamber comprising said anodic portion of said second bipolar electrode and having an inlet and an outlet;
- a third cathodic chamber spaced from and adjacent said third anodic chamber, said third cathodic chamber comprising a third cathodic electrode and having an inlet an outlet; and
- a third membrane disposed between and separating said third anodic chamber and said third cathodic chamber;
- wherein the second solution is also fed to said inlet of said third cathodic chamber; and
- wherein said outlet of said third anodic chamber is in fluid communication with said mixing chamber.

7. The system of claim 6 wherein said outlet of said cathodic chamber, said outlet of said second cathodic chamber, and said outlet of said third cathodic chamber are combined to a single unitary feed chamber having an outlet, wherein said single unitary feed chamber defines at least one aperture for removing hydrogen gas and/or at least some of the catholyte solution, and wherein said outlet of said single unitary feed chamber is in fluid communication with said inlet of said anodic chamber, said inlet of said second anodic chamber, and said inlet of said third anodic chamber, such that at least some of the catholyte solution is recycled and the first solution comprises the catholyte solution.

8. The system of claim 1, wherein the system further comprises a salt tank having an inlet and an outlet, where said inlet of said anodic chamber is in fluid communication with said outlet of said salt tank.

9. The system of claim 8, wherein the system further comprises a first heat exchanger, a second heat exchanger, and a third heat exchanger, where said first heat exchanger is coupled between said inlet of said salt tank and said dilution chamber, where said second heat exchanger is a heat recovery heat exchanger, and said third heat exchanger is a heater.

10. A method of generating a chlorine-containing mixture in a system, which comprises an anodic chamber comprising an anodic electrode and having an inlet for a first solution and an outlet for an anolyte solution, the outlet is bifurcated into a first outlet and a second outlet, the second outlet being in fluid communication with the inlet of the anodic chamber; a cathodic chamber spaced from and adjacent the anodic chamber, the cathodic chamber comprising a cathodic electrode and having an inlet for a second solution and an outlet for a catholyte solution, the second solution being the same as or different from the first solution and at least one of the first and second solutions comprising a chlorinated solution including chlorine-containing compounds; a membrane disposed between and separating the anodic chamber and the cathodic chamber; a dilution chamber having an inlet for an aqueous solution and an outlet; and a mixing chamber for generating a chlorine-containing mixture, the mixing chamber comprising a Venturi pump and being in fluid communication with the outlet of the dilution chamber the first outlet of the anodic chamber being in fluid communication with the mixing chamber, and the mixing chamber having an outlet for the chlorine-containing mixture; and a heat exchanger between the dilution chamber and the second outlet of the anodic chamber; wherein the outlet of the cathodic chamber is in fluid communication with the mixing chamber such that at least some of the catholyte solution is combined in the mixing chamber, and wherein the outlet of the anodic chamber is in fluid communication with the mixing chamber such that at least some of the anolyte solution is combined in the mixing chamber; said method comprises the steps of:
- disposing the first solution in the anodic chamber and the second solution in the cathodic chamber;
- applying a potential difference between the anodic electrode and the cathodic electrode such that the anolyte solution is formed from the first solution and the catholyte solution is formed from the second solution;
- wherein chlorine gas is generated in the anodic chamber along with the anolyte solution and wherein at least the chlorine gas is combined with the aqueous solution in the mixing chamber, and wherein a free available chlorine value of the chlorine-containing mixture is selectively controlled via the system;
- wherein the cathodic chamber defines at least one aperture for removing hydrogen gas and/or at least some of the catholyte solution, wherein the outlet of the cathodic chamber is in fluid communication with the inlet of the cathodic chamber such that said method further comprises recycling at least some of the catholyte solution and the second solution comprises the catholyte solution; and
- wherein the outlet of the anodic chamber is bifurcated into first and second outlets, wherein the first outlet is in fluid communication with the mixing chamber and wherein the second outlet is in fluid communication with the inlet of the anodic chamber such that at least some of the anolyte solution is fed to the mixing chamber and at least some of the anolyte solution is recycled such that the first solution comprises the anolyte solution.

11. The method of claim 10 wherein the system further comprises:
- an initial anodic chamber comprising an initial anodic electrode and having an inlet and an outlet;

an initial cathodic chamber spaced from and adjacent the initial anodic chamber, the initial cathodic chamber comprising an initial cathodic electrode and having an inlet and an outlet; and an initial membrane disposed between and separating the initial anodic chamber and the initial cathodic chamber;

wherein the outlet of the initial anodic chamber is in fluid communication with the inlet of the anodic chamber;

wherein the inlet of the initial cathodic chamber is bifurcated into first and second inlets, with the first inlet being in fluid communication with the initial cathodic chamber and the second inlet bypassing the initial cathodic chamber and being in fluid communication with the inlet of the cathodic chamber.

12. The method of claim 10 wherein the cathodic electrode of the cathodic chamber is further defined as a bipolar electrode having a cathodic portion and an anodic portion opposite the cathodic potion, the system further comprising:

a second anodic chamber comprising the anodic portion of the bipolar electrode and having an inlet and an outlet;

a second cathodic chamber spaced from and adjacent the second anodic chamber, the second cathodic chamber comprising a second cathodic electrode and having an inlet an outlet; and a second membrane disposed between and separating the second anodic chamber and the second cathodic chamber;

wherein the first solution is fed to the inlet of the anodic chamber and the inlet of the second anodic chamber; and wherein the outlet of the second anodic chamber is in fluid communication with the mixing chamber.

13. The method of claim 12 wherein the second cathodic electrode of the second cathodic chamber is further defined as a second bipolar electrode having a cathodic portion and an anodic portion opposite the cathodic potion, the system further comprising:

a third anodic chamber comprising the anodic portion of the second bipolar electrode and having an inlet and an outlet;

a third cathodic chamber spaced from and adjacent the third anodic chamber, the third cathodic chamber comprising a third cathodic electrode and having an inlet an outlet; and a third membrane disposed between and separating the third anodic chamber and the third cathodic chamber;

wherein the first solution is also fed to the inlet of the third anodic chamber; and wherein the outlet of the third anodic chamber is in fluid communication with the mixing chamber.

14. The method of claim 12 wherein the outlet of the cathodic chamber, the outlet of the second cathodic chamber, and the outlet of the third cathodic chamber are combined to a single unitary feed chamber having an outlet, wherein the single unitary feed chamber defines at least one aperture for removing hydrogen gas and/or at least some of the catholyte solution, and wherein the outlet of the single unitary feed chamber is in fluid communication with the inlet of the anodic chamber, the inlet of the second anodic chamber, and the inlet of the third anodic chamber, such that at least some of the catholyte solution is recycled and the first solution comprises the catholyte solution.

15. The method of claim 10 wherein the system is configured to reverse polarity of the cathodic electrode and the anodic electrode in response to a predetermined event, and wherein the method further comprises reversing polarity of the cathodic electrode and the anodic electrode in response to the predetermined event.

* * * * *